(12) United States Patent
Norman et al.

(10) Patent No.: US 9,607,259 B2
(45) Date of Patent: Mar. 28, 2017

(54) TAG HOUSING ASEMBLY FOR ATTACHMENT TO A BOTTLE NECK

(71) Applicants: Michael Norman, East Brunswick, NJ (US); Daniel V. Cunneen, Waldwick, NJ (US); Jake Strassburger, South Plainfield, NJ (US); Alex Tetiyevsky, Springfield, NJ (US)

(72) Inventors: Michael Norman, East Brunswick, NJ (US); Daniel V. Cunneen, Waldwick, NJ (US); Jake Strassburger, South Plainfield, NJ (US); Alex Tetiyevsky, Springfield, NJ (US)

(73) Assignee: B&G Plastics, Inc., Union, NJ (US)

( * ) Notice: Subject to any disclaimer, the term of this patent is extended or adjusted under 35 U.S.C. 154(b) by 16 days.

(21) Appl. No.: 14/768,957

(22) PCT Filed: Feb. 27, 2014

(86) PCT No.: PCT/US2014/018986
§ 371 (c)(1),
(2) Date: Aug. 19, 2015

(87) PCT Pub. No.: WO2014/134292
PCT Pub. Date: Sep. 4, 2014

(65) Prior Publication Data
US 2016/0004951 A1    Jan. 7, 2016

Related U.S. Application Data

(60) Provisional application No. 61/769,926, filed on Feb. 27, 2013, provisional application No. 61/769,917, (Continued)

(51) Int. Cl.
*G06K 19/06* (2006.01)
*G06K 19/077* (2006.01)
(Continued)

(52) U.S. Cl.
CPC ....... *G06K 19/07758* (2013.01); *B65D 23/14* (2013.01); *E05B 73/0041* (2013.01);
(Continued)

(58) Field of Classification Search
CPC ......... G08B 13/14; E05B 63/14; E05B 53/00; E05B 65/00; E05B 65/52; E05B 65/48;
(Continued)

(56) References Cited

U.S. PATENT DOCUMENTS 6,604,643 B1  8/2003  Michael et al.
6,696,955 B2  2/2004  Kolton et al.
(Continued)

*Primary Examiner* — Edwyn Labaze
(74) *Attorney, Agent, or Firm* — Hoffmann & Baron, LLP

(57) ABSTRACT

A tag housing assembly for attaching an electronic tag to an extending neck of a bottle with a perimetrical undercut thereabout. The tag housing assembly includes a tag housing, at least one electronic tag and a retaining device. The tag housing includes a perimetrical exterior side wall extending between a top surface and a base plate to define an interior and an opening extending through the top surface and base plate for receiving the extending neck of the bottle. The at least one electronic tag is located in the interior. The retaining device extends into the opening and defines an adjustable aperture for engaging the extending neck of the bottle. When the tag housing is in a closed position, the retaining device is secured to the neck of the bottle.

20 Claims, 16 Drawing Sheets

Related U.S. Application Data filed on Feb. 27, 2013, provisional application No. 61/819,012, filed on May 3, 2013.

(51) Int. Cl.
  *B65D 23/14* (2006.01)
  *E05B 73/00* (2006.01)
  *G08B 13/24* (2006.01)

(52) U.S. Cl.
  CPC ...... G06K 19/0772 (2013.01); *B65D 2203/10* (2013.01); *G08B 13/2434* (2013.01)

(58) Field of Classification Search
  CPC .......... G06F 17/00; G06K 7/00; G06K 19/06; G06K 7/08
  USPC ... 235/492, 375, 451, 439, 440; 70/57.1, 63, 70/266; 340/572.1, 572.8, 572.9
  See application file for complete search history.

(56) References Cited

U.S. PATENT DOCUMENTS

| | | | |
|---|---|---|---|
| 6,769,557 B2 | 8/2004 | Michael et al. | |
| 7,007,523 B2 | 3/2006 | Belden, Jr. | |
| 7,259,674 B2 | 8/2007 | Marsilio et al. | |
| 7,650,768 B2 | 1/2010 | Fawcett et al. | |
| 7,804,405 B2 | 9/2010 | Norman et al. | |
| 8,228,200 B2 | 7/2012 | Kolton et al. | |
| 8,267,326 B2 | 9/2012 | Kolton et al. | |
| 8,730,046 B2 | 5/2014 | Strassburger et al. | |
| 2007/0062903 A1 | 3/2007 | Norman et al. | |
| 2007/0163309 A1* | 7/2007 | Fawcett | E05B 73/0017 70/57.1 |
| 2007/0262876 A1 | 11/2007 | Marsilio et al. | |
| 2008/0030334 A1 | 2/2008 | Marsilio et al. | |
| 2008/0048868 A1 | 2/2008 | Chua et al. | |
| 2008/0291025 A1* | 11/2008 | Perez | E05B 73/00 340/572.1 |
| 2009/0152230 A1* | 6/2009 | Belden, Jr. | E05B 73/0041 215/221 |
| 2010/0005840 A1* | 1/2010 | Hogan | E05B 73/0017 70/63 |
| 2010/0133224 A1 | 6/2010 | Kolton et al. | |
| 2010/0242552 A1* | 9/2010 | Sayegh | E05B 73/0017 70/58 |
| 2010/0253524 A1 | 10/2010 | Kolton et al. | |
| 2011/0074583 A1 | 3/2011 | Kolton et al. | |
| 2013/0321153 A1* | 12/2013 | Yang | E05B 73/0041 340/572.1 |

\* cited by examiner

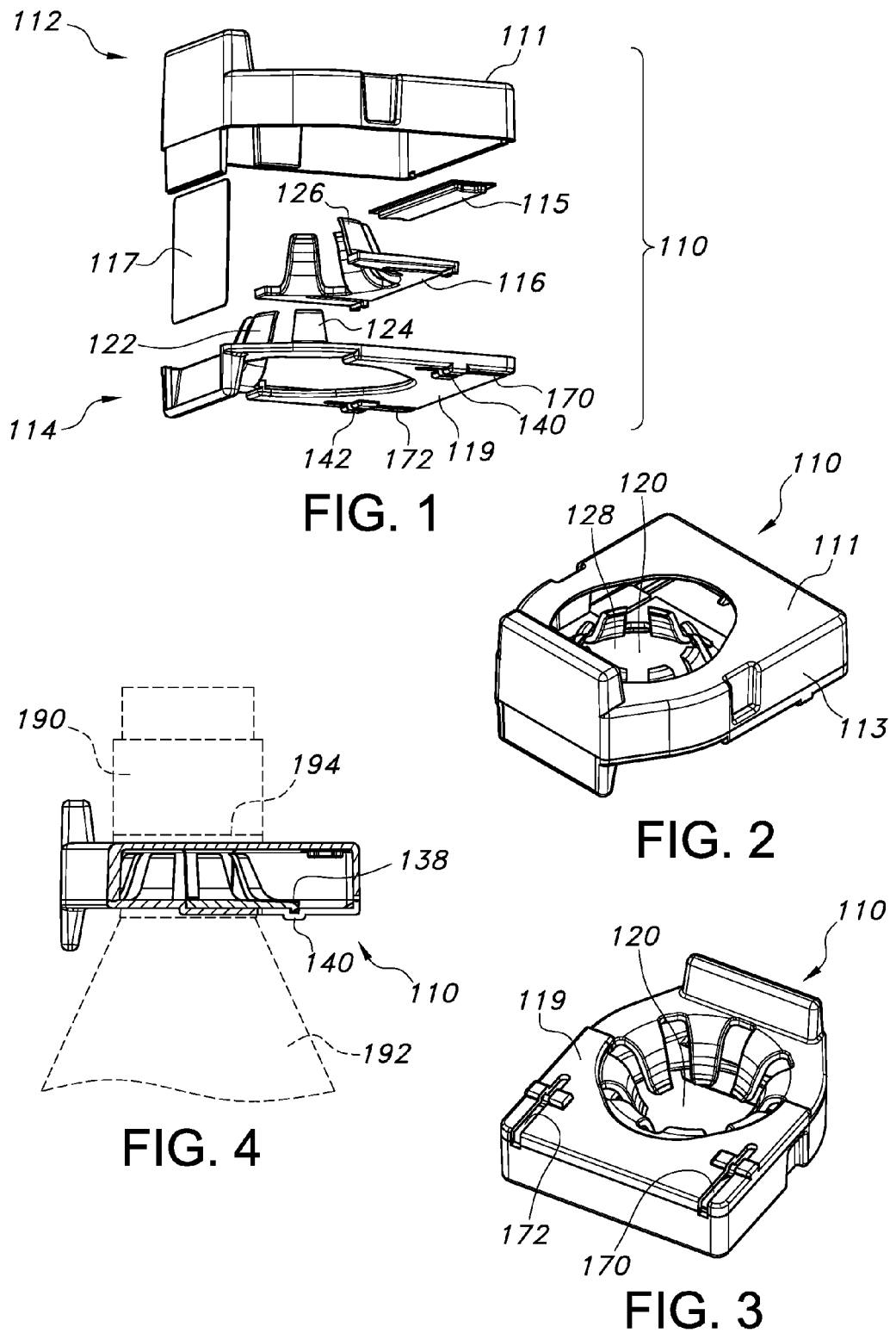

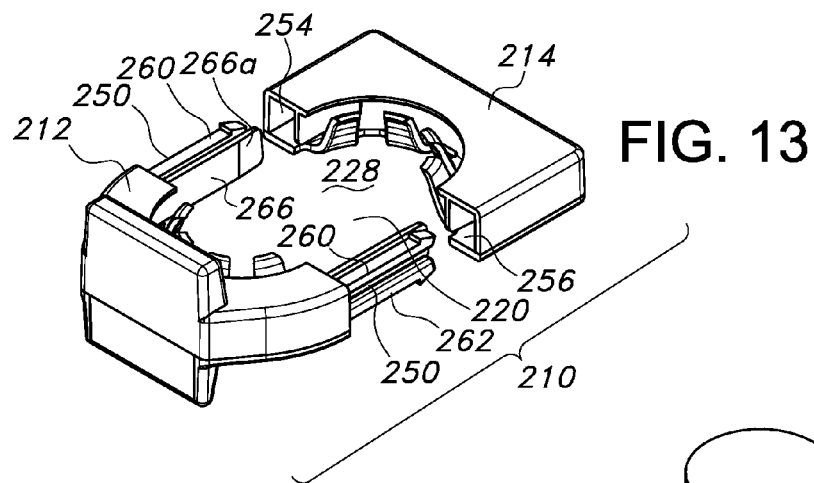
FIG. 13
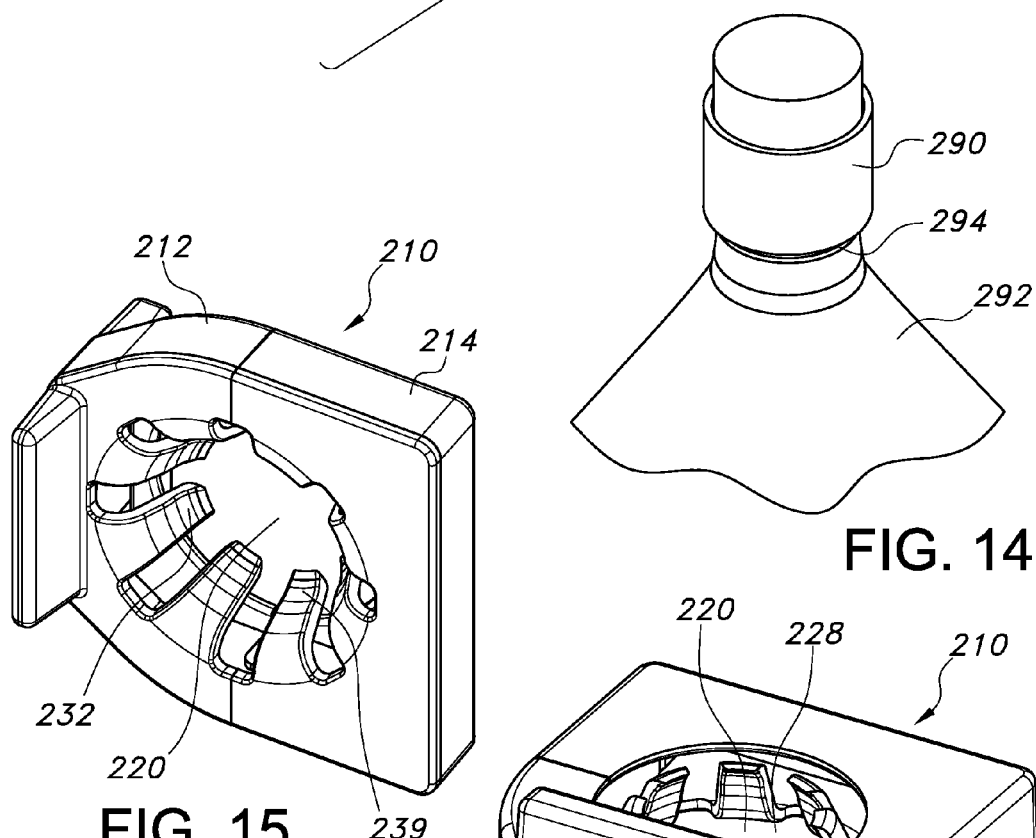
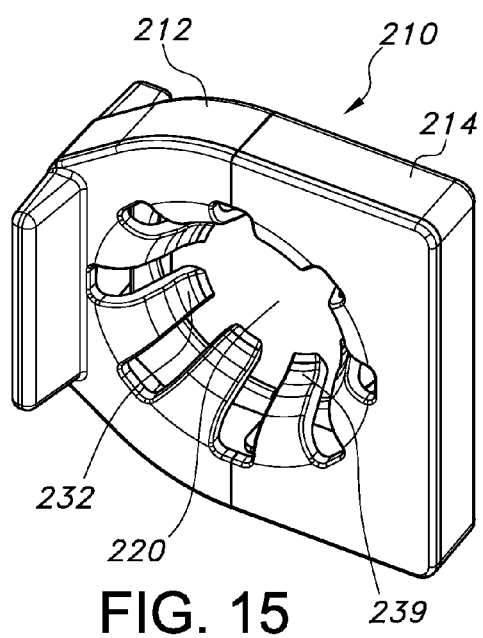
FIG. 14
FIG. 15
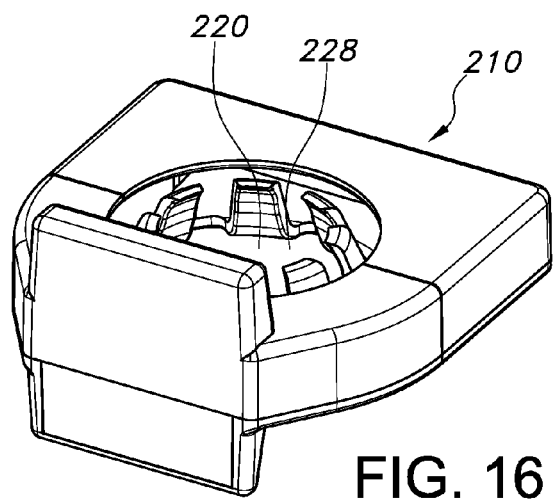
FIG. 16

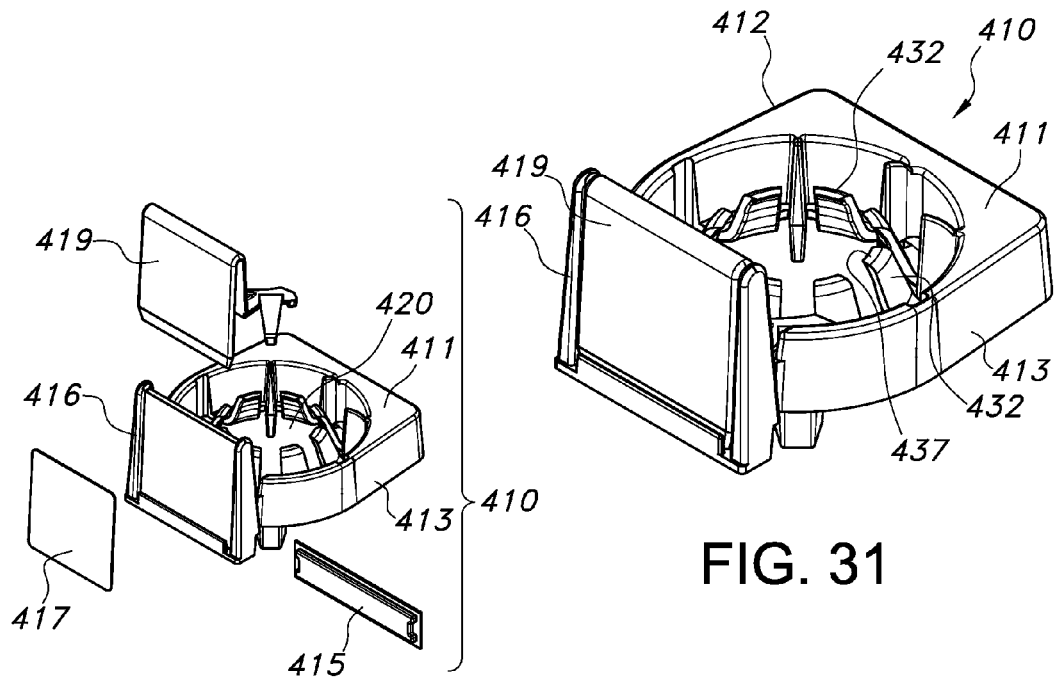
FIG. 30
FIG. 31
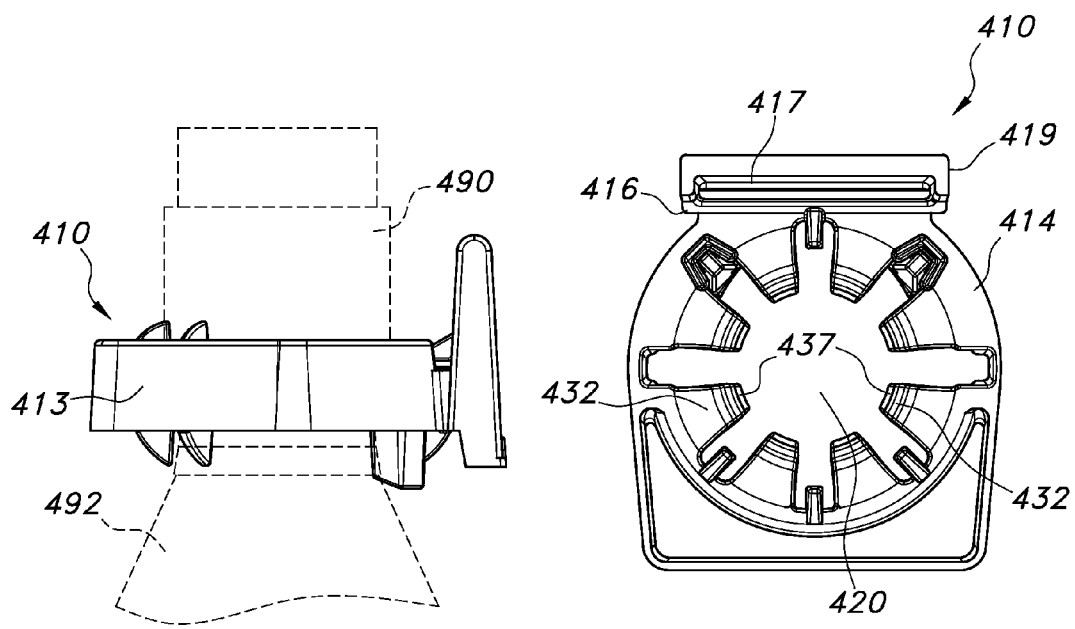
FIG. 32
FIG. 33

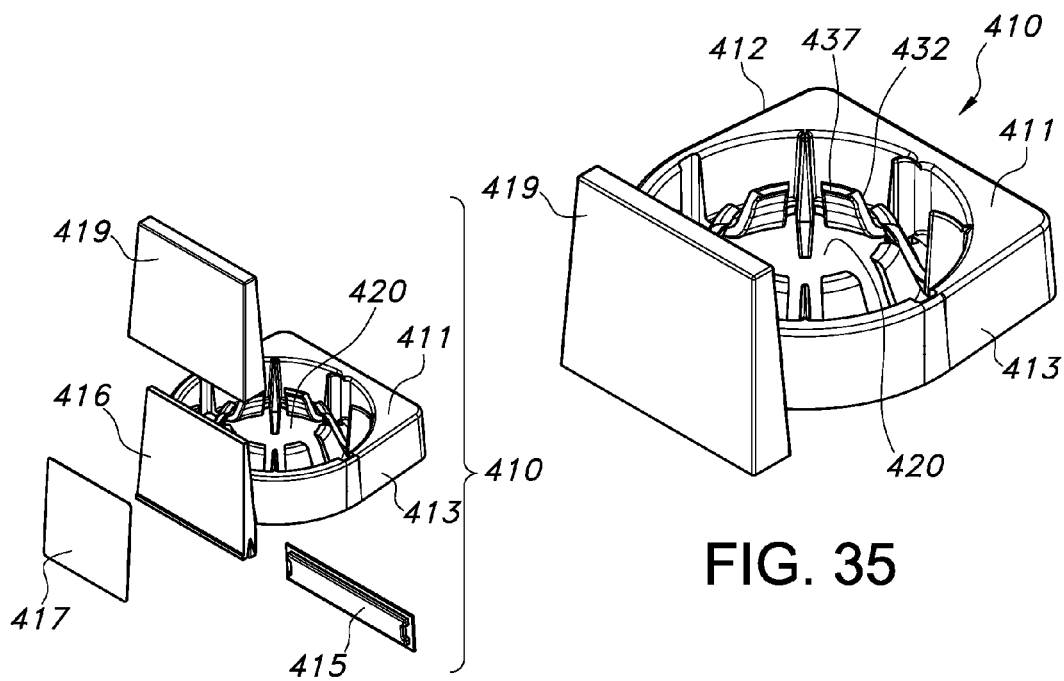
FIG. 34
FIG. 35
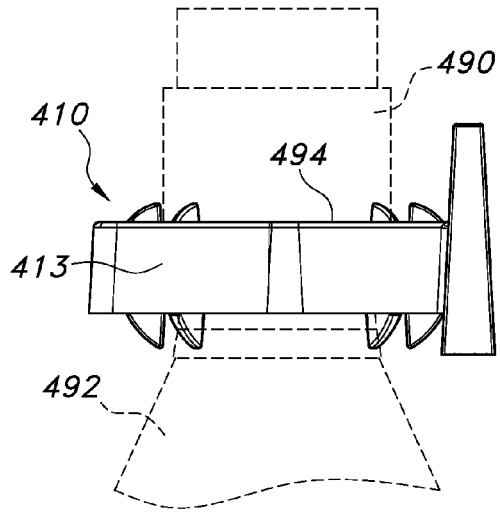
FIG. 36
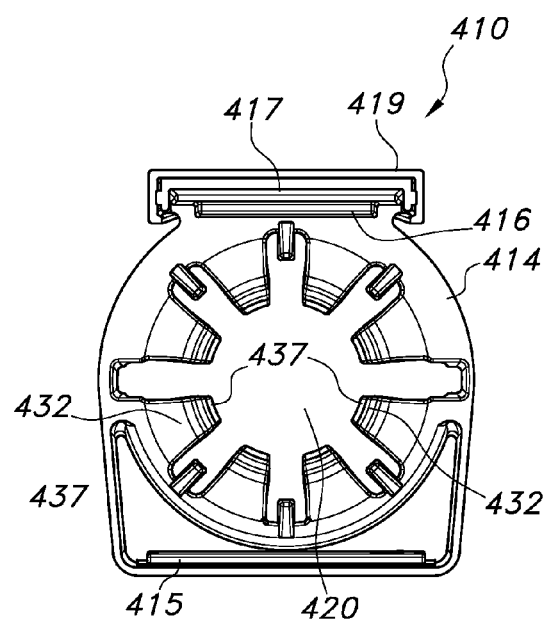
FIG. 37

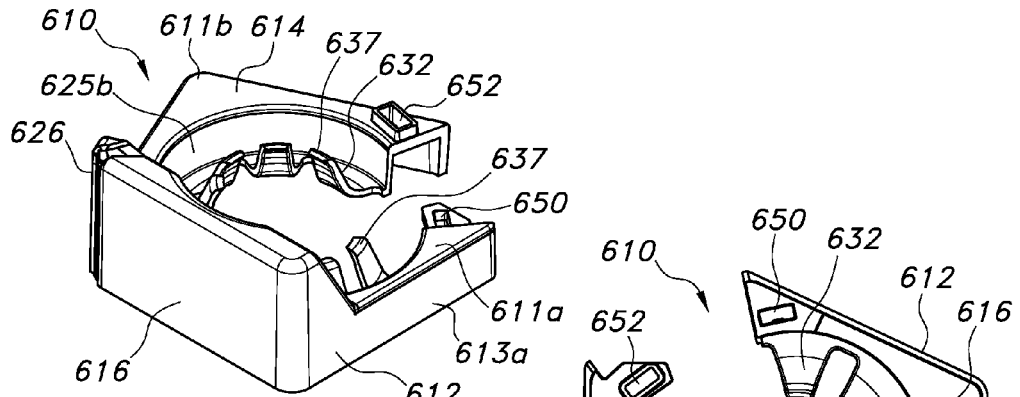
FIG. 47
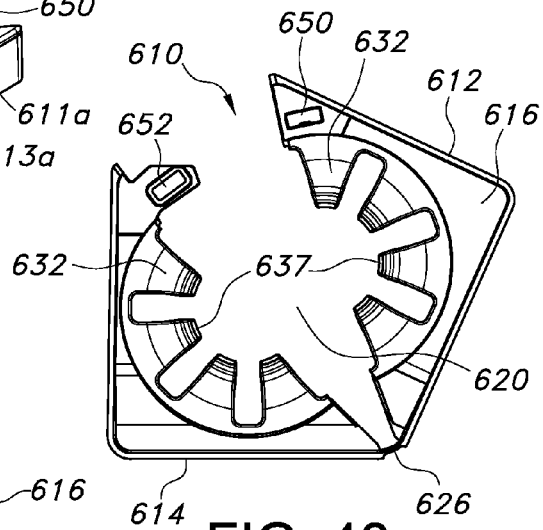
FIG. 48
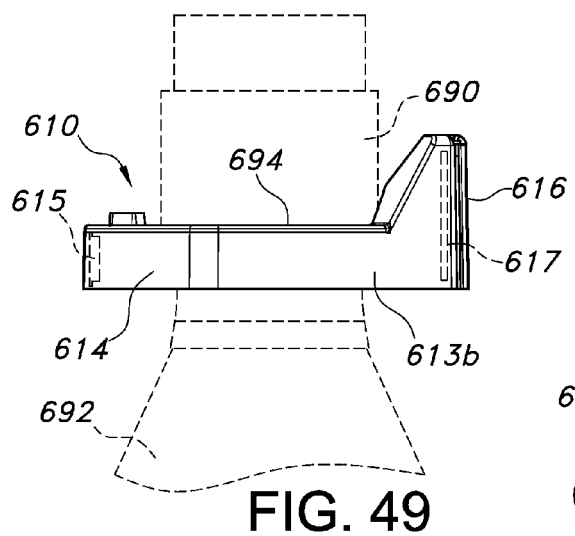
FIG. 49
FIG. 50
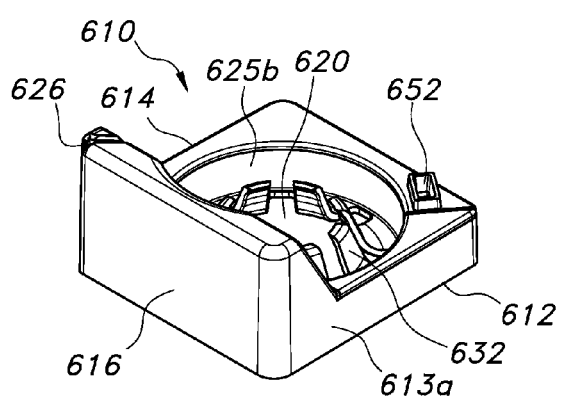
FIG. 51

TAG HOUSING ASEMBLY FOR ATTACHMENT TO A BOTTLE NECK

This application claims priority based on international patent application no. PCT/US2014/018986, filed on Feb. 27, 2014, which claims priority based on U.S. provisional application no. 61/769,917, filed on Feb. 27, 2013; U.S. provisional application no. 61/769,926, filed on Feb. 27, 2013; and U.S. provisional application no. 61/819,012, filed on May 3, 2013, all of which are incorporated herein in their entirety.

FIELD OF THE INVENTION

The present invention relates generally to housings that accommodate electronic tags such as radio frequency identification (RFID) tags or electronic article surveillance (EAS) tags attached to an extending neck of a bottle. More particularly, the present invention relates to a single component or dual component tag housing, which may be securely attached to the extending neck of a bottle and subsequently removed therefrom. Alternatively, the present invention relates to a one-piece tag housing which may be non-removably attached to the extending neck of a bottle.

BACKGROUND OF THE INVENTION

Electronic tags are used for a wide variety of purposes including the tracking of items that contain the tag, inventory control, security and also provide information that may be electronically readable. These tags or markers may include radio frequency identification (RFID) tags or electronic article surveillance (EAS) tags, which include dual resonator (DR) tags and radio frequency (RF) tags.

SUMMARY OF THE INVENTION

The present invention is a tag housing assembly for attaching an electronic tag to an extending neck of a bottle with a perimetrical undercut thereabout. The tag housing assembly includes a tag housing, at least one electronic tag and a retaining device. The tag housing includes a perimetrical exterior side wall extending between a top surface and a base plate to define an interior and an opening extending through the top surface and base plate for receiving the extending neck of the bottle. The at least one electronic tag is located in the interior. The retaining device extends into the opening and defines an adjustable aperture for engaging the extending neck of the bottle. When the tag housing is in a closed position, the retaining device is secured to the neck of the bottle.

The retaining device can include a plurality of flexible fingers, wherein each flexible finger extends from the base plate to a distal end for surrounding engagement with the neck of the bottle. Preferably, the flexible fingers extend upwardly from the base plate. The retaining device can be either fixedly or movably attached to the base plate so that the adjustable aperture can be increased or decreased to receive a bottle neck inserted through the base plate. After the perimetrical undercut passes through the adjustable aperture, the distal ends of the fingers engage the perimetrical undercut and prevent the tag housing assembly from being removed from the bottle.

The tag housing assembly can include a first housing and a second housing that are detachably connected or fixedly attached. After the first and second housings are joined together, they can be secured in a locked position, which prevents the tag housing assembly from being removed from the bottle neck. In one embodiment, the first and second housings are pivotably connected by a hinge on one side of the tag housing and Examples of such tag housings are shown in commonly assigned U.S. Pat. Nos. 8,228,200; 8,267,326; and commonly assigned U.S. Patent Publication Nos. 2010/0133224 and 2011/0074583, the disclosures of these patents and publications are incorporated by reference herein for all purposes.

As particularly shown in the above incorporated U.S. Pat. No. 8,267,326, issued Sep. 18, 2012, entitled "Tag for Bottle Neck Having Integral Locking Ring," a tag housing may be attachable to the extending neck of a bottle where the extending neck has an undercut. Flexible fingers supported within the tag housing engage the undercut. The flexible fingers may be tightened onto the bottle neck to secure the tag housing to the bottle neck by use of a surrounding cable tie. The cable tie may be tightened around the flexible fingers to urge the fingers inwardly to securely engage the undercut of the bottle neck. This secures the tag housing to the bottle neck. In order to remove this tag from the bottle neck, the cable tie must be severed releasing the grip of the fingers around the bottle neck.

While this tag housing serves adequately for its intended purposes, removal from the bottle neck after the tag housing has served its purpose is difficult and cumbersome as it must be forcibly removed from the bottle neck. This becomes difficult and time consuming for the user who has purchased the bottle with the tag housing in place. Other tag housings include movable retaining devices, which can be released using a tool so as to permit removal of the housing from the bottle neck. While these tag housings serve adequately for their intended purposes, the ability to remove the housing from the bottle neck requires the housing to be formed of multiple components, which increases the cost of the tag housing. locked together by a latching mechanism on the opposite side. Preferably, when the first and second housings are pivotably connected, the pivoting of the first and second housings bisects the opening. The first housing can include a first latching element and the second housing can include a second latching element opposite the hinge. Preferably, the first and second latching elements are first and second latching apertures, respectively. When the tag housing is in the closed position, the first and second latching apertures are aligned and a latching pin is inserted in the first and second latching apertures to lock the tag housing.

In another embodiment, the exterior side wall has a first end and a second end and first and second substantially parallel sides extending therebetween. The first housing includes the first end and the first side and the second housing includes the second end and the second side. The first housing includes a pair of arms and the second housing includes a pair of passages for receiving the arms. Each of the pair of arms has a latch for adjustably securing the arms in the passages and joining the first and second housings. The adjustment of the latch for securing the arms can be used to change the size of the adjustable aperture.

In another embodiment, the retaining device can be an interior wall extending between the top surface and the base plate that defines the opening in the tag housing. The interior wall can have a plurality of substantially parallel ribs extending into the opening and perpendicular to the top surface and the base plate.

In one embodiment, the retaining device includes a first section fixedly attached to the base plate and a second section that is movably attached to the base plate. The movement of the second section changes the size of the adjustable aperture. The tag housing can include a locking mechanism for locking the movable second section of the retaining device in a fixed position. In a preferred embodiment, the second section of the retaining device is movable within the housing interior upon application of a removal tool, which moves the second section to change the size of the adjustable aperture.

BRIEF DESCRIPTION OF THE DRAWINGS

The preferred embodiments of the removable bottle neck tag housing of the present invention, as well as other objects, features and advantages of this invention, will be apparent from the accompanying drawings wherein:

FIG. 1 is an exploded, perspective view of the single component tag housing of the first embodiment of the present invention.

FIGS. 2 and 3 show, respectively, top and bottom perspective views of the assembled housing assembly shown in FIG. 1.

FIG. 4 is a sectional view of the assembled housing assembly shown in FIG. 1 secured to a bottle neck.

FIG. 13 is a top, perspective view of the unassembled tag housing assembly of the second embodiment of the present invention.

FIG. 14 shows the upper portion of a bottle onto which the tag housing shown in FIG. 13 is applied.

FIGS. 15 and 16 are bottom perspective and top perspective views of the tag housing shown in FIG. 13 in the assembled condition.

FIG. 30 is an exploded, perspective view of the tag housing assembly of the fourth embodiment of the present invention with a snap on cover for enclosing a security device.

FIG. 31 is a top, perspective view of the tag housing assembly shown in FIG. 30 with the cover for the security device in the closed position.

FIG. 32 is a side view of the tag housing assembly shown in FIG. 31 secured to a bottle.

FIG. 33 is a bottom view of the tag housing assembly shown in FIG. 31.

FIG. 34 is an exploded, perspective view of the tag housing assembly of the fourth embodiment of the present invention with an attachable cover for enclosing a security device.

FIG. 35 is a top, perspective view of the tag housing assembly shown in FIG. 34 with the cover for the security device in the closed position.

FIG. 36 is a side view of the tag housing assembly shown in FIG. 35 attached to a bottle.

FIG. 37 is a bottom view of the tag housing assembly shown in FIG. 35.

FIG. 47 is a perspective, top view of the pivotable tag housing assembly of the sixth embodiment of the present invention in the open position.

FIG. 48 is a top view of the pivotable tag housing assembly shown in FIG. 47.

FIG. 49 is a side view of the pivotable tag housing assembly shown in FIG. 47 attached to a bottle.

FIG. 50 is a bottom view of the pivotable tag housing assembly shown in FIG. 47.

FIG. 51 is a top, perspective view of the pivotable tag housing assembly shown in FIG. 47 in the closed position.

DETAILED DESCRIPTION OF THE PREFERRED EMBODIMENTS

Figure 5:
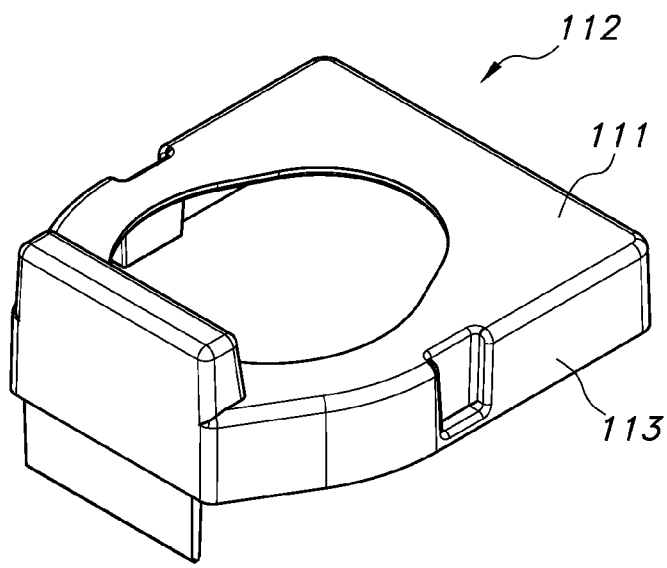
FIG. 5 is a top, perspective view of the upper housing portion of the housing assembly shown in FIG. 1.

The present invention provides a tag housing assembly for attaching at least one electronic tag to an extending neck of a bottle that can have a perimetrical undercut thereabout. In a first embodiment, the housing assembly includes a housing having an upper housing portion and a lower housing portion defining an interior therebetween. The upper housing portion has a top surface with a perimeter and a side wall extending downwardly from the perimeter. The lower housing portion has a substantially flat base with a bottom surface. A substantially round or oval opening extends from the top surface of the upper housing portion to the bottom surface of the lower housing portion for receiving the extending neck of the bottle. The housing interior accommodates at least one electronic tag. The housing has a fixed retaining device on one side of the opening and a movable retaining device on the opposite side. The fixed and movable retaining devices define an adjustable aperture for accommodation around the neck of a bottle. The movable retaining device is positioned in a clamping position for securing the housing to the neck of the bottle. The movable retaining device is positioned in a release position to remove the housing from the neck of the bottle.

In a second embodiment, the housing assembly includes a first housing capable of supporting at least one electronic tag and a second housing capable of supporting at least one electronic tag. The first and second housings are detachably coupled to define a substantially round or oval opening therebetween for receiving the extending neck of the bottle. Each of the first and second housings includes one or more retaining devices disposed about the opening, which define therebetween an adjustable aperture for accommodating the neck of the bottle therethrough. The first and second housings are movable to an attached, clamped position about the bottle neck and subsequently movable to a detached, unclamped position to permit removal of the first and second housings from about the bottle. A removal tool can be used to detach the first housing from the second housing.

In a third embodiment, the housing assembly includes a tag housing assembly for securement to a bottle neck having a perimetrical undercut thereabout. The housing device includes a one-piece housing having inner and outer perimetrical walls and a planar surface joining the walls. The walls extend from the same side of the planar surface to define a cavity which is open on the side opposite the planar surface, for receipt of an electronic tag. The inner wall defines an aperture for accommodation of the bottle neck therethrough. A resilient retaining device extends from the inner wall into the aperture for retentively engaging the bottle neck and securing the housing within the undercut of the bottle neck. Preferably, the resilient retaining device is formed by a plurality of flexible fingers that engage the perimetrical undercut of the bottle neck.

In a fourth embodiment, the housing assembly includes a housing having an upper housing portion and a lower housing portion defining an interior therebetween. The upper housing portion has a top surface with a perimeter and a side wall extending downwardly from the perimeter. The lower housing portion has a substantially flat base with a bottom surface. A substantially round or oval opening extends from the top surface of the upper housing portion to the bottom surface of the lower housing portion for receiving the extending neck of the bottle. The housing interior accommodates at least one electronic tag. The lower housing portion has an interior perimetrical wall that defines the opening and extends to the upper housing portion when the two housing are joined together. The lower housing portion also has a flexible retaining device extending from the base of the interior perimetrical wall into the opening. The flexible retaining device defines an adjustable aperture for accommodation around the neck of a bottle. Preferably, the flexible retaining device is formed by a plurality of flexible fingers. The neck of the bottle is inserted into the opening and the flexible fingers engage the perimetrical undercut of the bottle neck with their distal ends.

In a fifth embodiment, the housing assembly includes a first housing capable of supporting at least one electronic tag and a second housing capable of supporting at least one electronic tag. The first and second housings each have a top and bottom surface connected by an interior side wall and an exterior side wall. The first and second housings are adjustably and detachably coupled to define a substantially round or oval adjustable opening therebetween for receiving the extending neck of the bottle. The first housing has a pair of passages for adjustably receiving a pair of arms that extend from the second housing on either side of the opening. The first and second housings can include one or more ribs disposed on the interior side wall and extending between the top and bottom surfaces, which engagingly secure the neck of the bottle therebetween. The first and second housings are movable to one or more attached, clamped positions about the bottle neck, which accommodates different size bottle necks, and subsequently movable to a detached, unclamped position to permit removal of the bottle from the opening.

In a sixth embodiment, the housing assembly includes a first housing capable of supporting at least one electronic tag and a second housing capable of supporting at least one electronic tag. The first and second housings each have a top surface, an exterior side wall and an interior side wall. The first and second housings are pivotally connected on one side and attachably coupled on the opposing side so that the two housings pivot in a plane that is parallel to the top surface. When the first and second housings are coupled, the interior side walls define a substantially round or oval opening therebetween for receiving the extending neck of the bottle. A flexible retaining device extends around the opening and defines an adjustable aperture for accommodation around the neck of a bottle. Preferably, the flexible retaining device is formed by a plurality of flexible fingers, which engage the perimetrical undercut of the bottle neck with their distal ends. The first and second housings are movable to an attached, coupled or clamped position about the bottle neck and subsequently movable to a detached, unclamped position to permit removal of the bottle from the opening.

The tag housing assembly and the different embodiments will now be described with respect to the drawings. In the first embodiment, the tag housing assembly 110 of the present invention is shown in FIGS. 1-4. The tag housing assembly 110 includes an upper housing portion 112, also shown in FIG. 5; a lower housing portion 114, also shown in FIG. 7; and a movable retaining device 116, also shown in FIG. 6. The upper housing portion 112 is formed by a top surface 111 and a perimetrical side wall 113 extending downwardly from the edges. The lower housing portion 114 includes a base plate 119. When assembled as shown in FIGS. 2, 3 and 4, the housing assembly 110 supports one or more electronic tags, such as an EAS tag 115 and/or a RFID tag 117, in an interior thereof. The upper housing portion 112 is joined with the lower housing portion 114 and can be secured thereto using a variety of securement techniques, preferably ultrasonic welding around the peripheral rim thereof.

The upper and lower housing portions 112 and 114 have an aligned central opening 120 therethrough for accommodation over the extending neck 190 of a bottle 192 with a perimetrical indent 194 (FIG. 3). The lower housing portion 114 includes a fixed retaining device 122 in the form of a plurality of spaced apart flexible fingers 124 extending approximately half way about the opening 120. The lower housing portion 114 also supports a movable retaining device 116 in the interior of housing assembly 110. The movable retaining device 116 also includes a plurality of spaced apart flexible fingers 126 extending half way about the opening 120. Together the flexible fingers 124, 126 of the fixed and movable retaining devices 114, 116 define an adjustable aperture 128 for surrounding accommodation of the neck 190 of the bottle 192 extending through opening 120.

Figure 6:
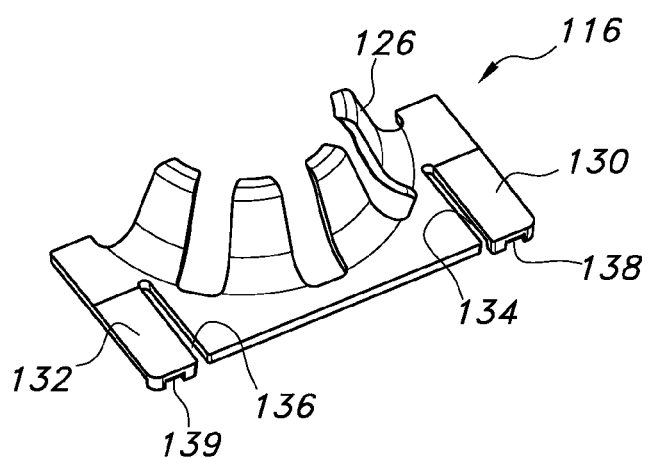
FIG. 6 is a top, perspective view of the movable second section of the retainer device of the first embodiment.
Figure 7:
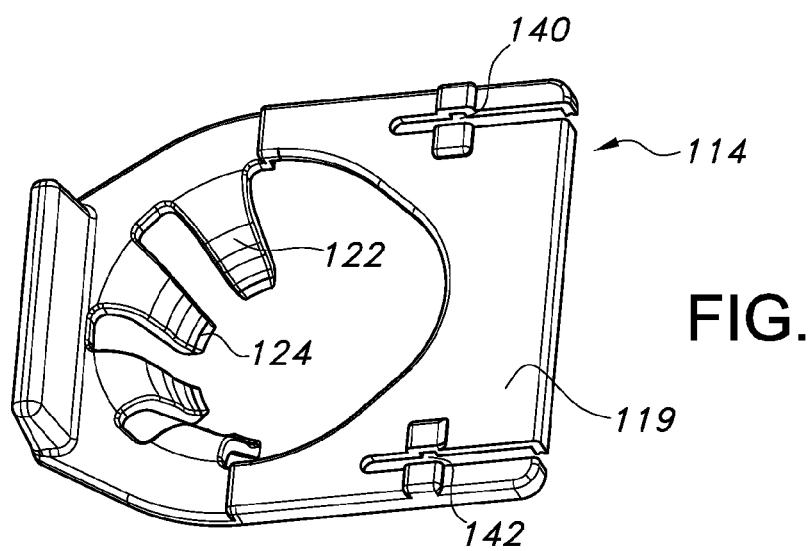
FIG. 7 is a bottom, perspective view of the lower housing portion of the housing assembly shown in FIG. 1 with the movable section of the retainer device removed.
Figure 8:
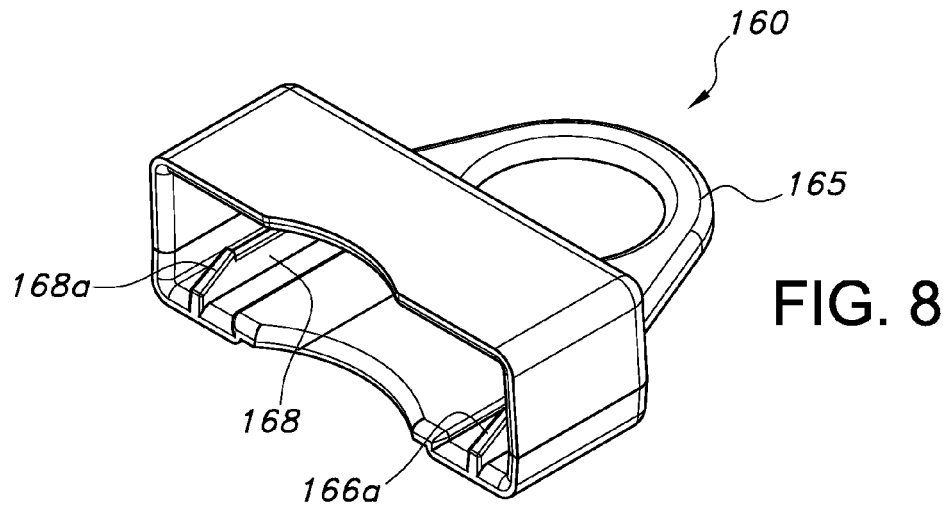
FIG. 8 is a perspective view of the removal tool used in combination with the housing assembly shown in FIG. 1.
Figure 9:
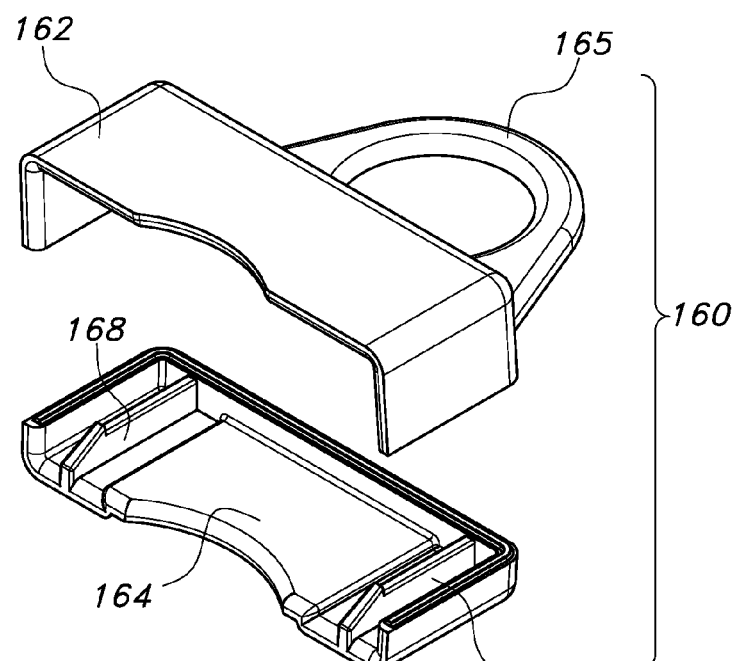
FIG. 9 is an exploded, perspective view of the removal tool shown in FIG. 8.
Figure 10:
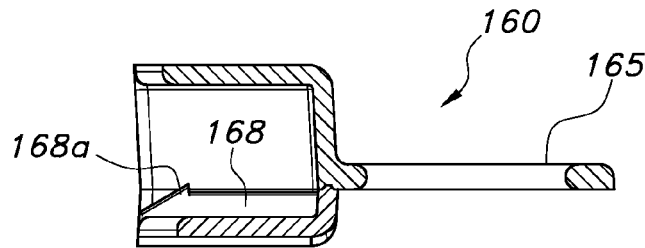
FIG. 10 is a side, sectional view of the removal tool shown in FIG. 8.
Figure 11:
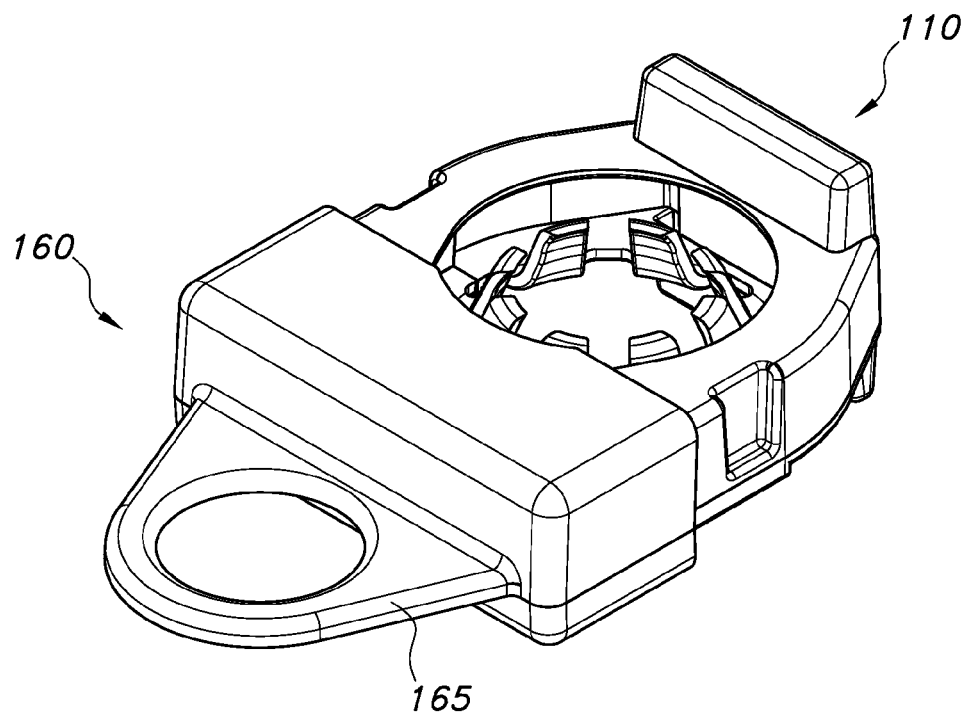
FIGS. 11 and 12 show, respectively, top, perspective and cross sectional side views of the tool of FIG. 8 attached to the housing assembly shown in FIG. 1.
Figure 12:
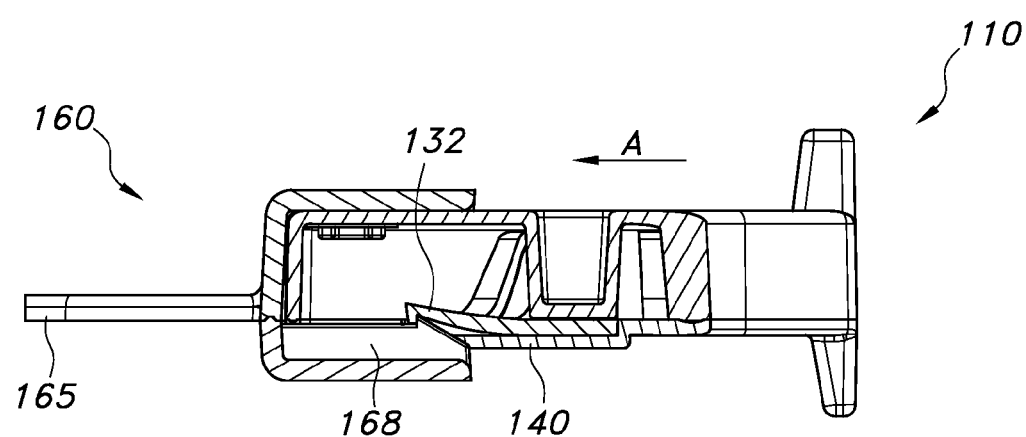

The movable retaining device as shown in FIG. 6 includes a pair of wings 130 and 132 separated by slots 134 and 136. The wings are capable of flexing slightly upwardly so that when the retaining device is positioned within the bottom housing portion 114 and moved to a forward position, tabs 138, 139 can be inserted into recesses 140, 142 formed in lower housing portion 114. When seated in lower housing portion 114, the movable retaining device 116 is adjusted so as to move forward towards the fixed retaining device 122 as shown in FIG. 4 whereupon the movable retaining device 116 is placed in a clamping position with the fixed retaining device 122 to clamp the housing assembly 110 to the neck 190 of bottle 192 beneath undercut 194. Thus, in the clamping position, the housing assembly 110 is fixedly coupled to the neck 190 of the bottle 192.

In order to remove the housing from its clamped position with the neck 190 of the bottle 192, a removal tool is employed. The removal tool 160 is shown in FIGS. 8-12. The removal tool 160 includes an upper portion 162 and a lower portion 164, which are ultrasonically or similarly coupled together. The lower portion 164 includes a pair of spaced apart rails 166 and 168. Upon placing the removal tool 160 into engagement with the housing assembly 110, the rails 166, 168 are inserted into slots 170 and 172 in the base plate 119 of the lower housing portion 114 (FIGS. 1, 3). Each of the rails 166, 168 has a tapered lead-in portion 166a and 168a, which engages the tabs 138, 139 of movable retaining device 116 and lift the wings 130 and 132 upwardly and out of their seated engagement with the recesses 140, 142. Thereafter, the back end of the tapered lead-in portions 166a, 168a engages the tabs 138, 139. The handle 165 on the removal tool 160 is used to pull backward (in the direction of arrow A—FIG. 12)) so that it moves back in slots 170 and 172 thereby pulling back on retaining device 116, expanding opening 128 and moving fingers 126 away from clamping engagement with the bottle neck 190. Once this is achieved, the removal tool 160 can be removed from the housing assembly 110 and the housing assembly 110 may be lifted from the bottle neck 190 removing the housing assembly 110 therefrom.

It is contemplated that such a removal tool 160 would be employed at the point of purchase such as a checkout counter after the tag housing 110 attached to the bottle 192 is been scanned at the check-out counter and the information contained on the RFID 117 and/or EAS tags 115 is retrieved and/or the alarm is deactivated.

In the second embodiment, the tag housing assembly 210 of the present invention is shown in FIGS. 13 and 15-18. The tag assembly 210 includes a first housing 212 and a second housing 214, which are detachably coupled together to define therebetween an opening 220 for receiving the extending neck 290 of a bottle 292 with a perimetrical undercut 294.

Figure 17:
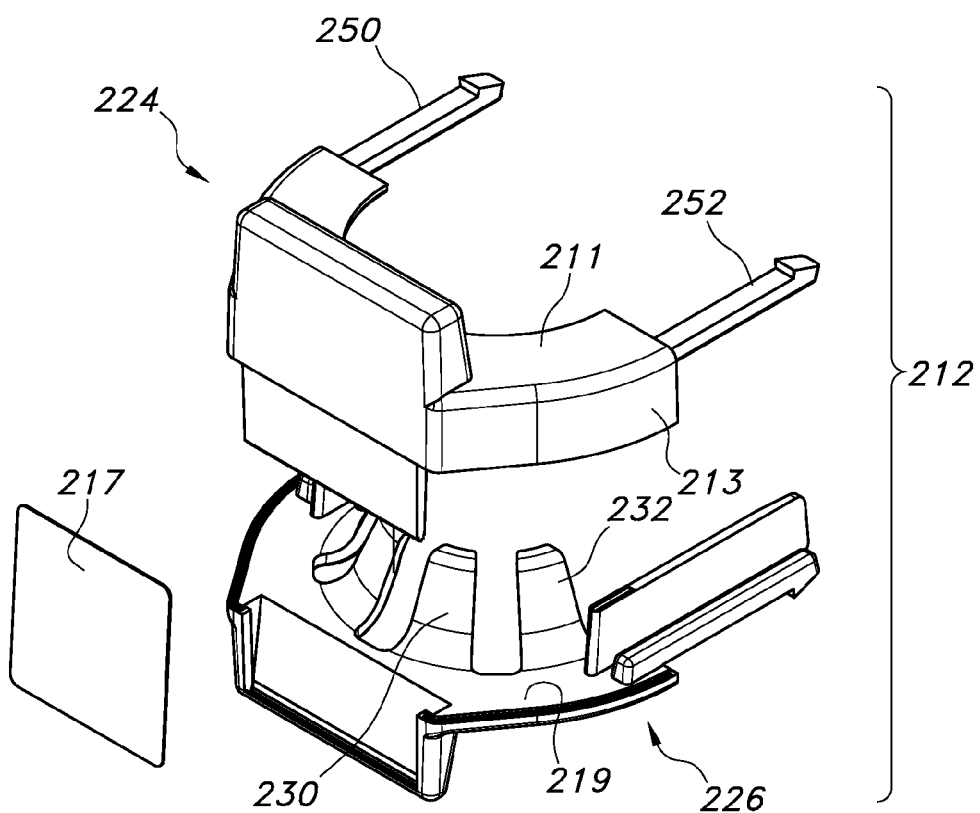
FIG. 17 is an exploded perspective view of the first housing of the tag housing assembly shown in FIG. 13.

As more clearly illustrated in FIG. 17, the first housing 212 includes an upper portion 224 and a lower portion 226. The upper portion 212 includes a top surface 211 with a perimetrical side wall 213 extending downwardly from the outer edges. The lower portion 214 includes a base plate 219. The first housing 212 is designed to accommodate therebetween an electronic tag such as an RFID tag 217. The upper portion 224 is coupled to the lower portion 226 by ultrasonic welding or similar attachment techniques. The lower portion 226, as shown in FIG. 17, includes a first retaining device 230 which includes a plurality of upwardly extending spaced apart fingers 232. The fingers 232 extend approximately half way about the opening 220 as shown in FIG. 13.

Figure 18:
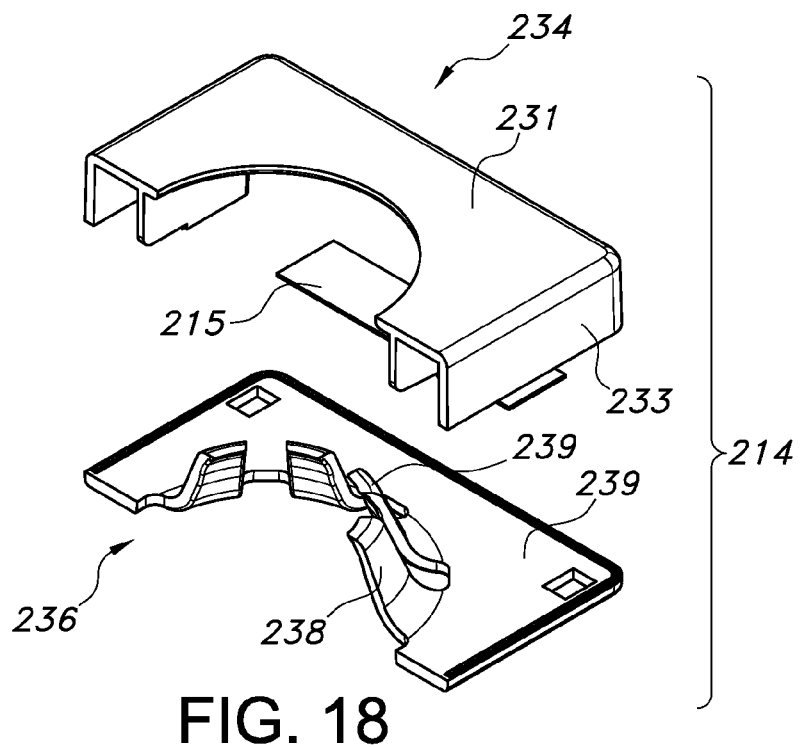
FIG. 18 is an exploded perspective view of the second housing of the tag housing assembly shown in FIG. 13.

FIG. 18 shows the second housing 214 including an upper portion 234 and a lower portion 236. The housing portions 234 and 236 accommodate therebetween an electronic tag, such as an EAS tag 215. The lower portion 236 includes a base plate 239 and a retaining device 238 having a plurality of upwardly extending flexible fingers 239, which also extends half way about opening 220. Together the flexible fingers 232, 239 of the retaining devices 230, 238 define an adjustable aperture 228 (FIG. 13) for surrounding accommodation of the neck 290 of the bottle 292.

Referring again to FIG. 13, the first housing 212 includes a pair of extending arms 250, which are designed to be inserted into passages 254 and 256 in the second housing 214. Each arm 250 includes a pair of elongate upper and lower spring latches 260, 262, which are deflectable to lockingly couple the first housing 212 to the second housing 214 at one or more locations, as shown in further detail with respect to the description of FIG. 20 hereinbelow. The arms 250 also include a stiffening member 266 having a tapered lead-in 266a to help insert and support the first housing 212 and second housing 214 and prevent inadvertent separation of the two housings 212, 214.

The two housings 212 and 214 are joined together into a closed or clamping position, as shown in FIGS. 15 and 16. In the clamping position, the housing assembly 210 can be fixedly coupled to the neck 290 of a bottle 292, such as the one shown in FIG. 14. The fingers 232, 239 engage the neck 290 below the undercut 294 on the bottle 292 and the tag housing assembly 210 can only be removed using the removal tool 280.

Figure 20:
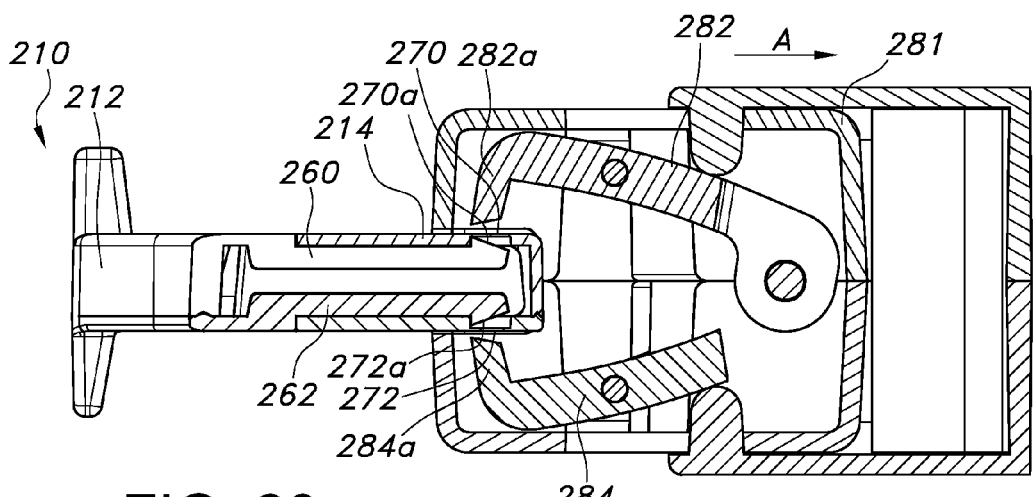
FIG. 20 is a cross sectional view of the removal tool shown in FIG. 19 applied to the tag housing assembly shown in FIG. 13.
Figure 21:
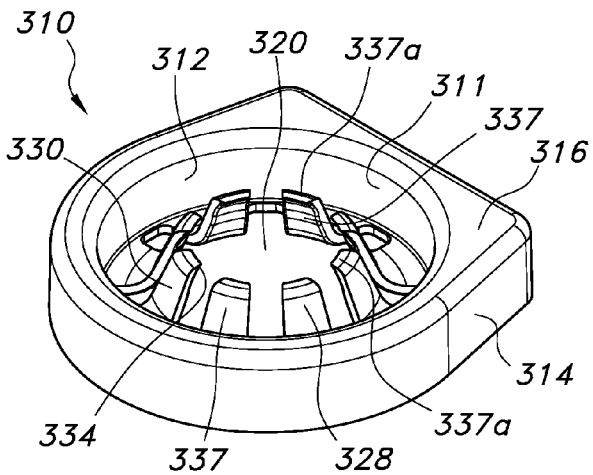
FIG. 21 is a top, perspective view of the tag housing assembly of the third embodiment of the present invention.
Figure 22:
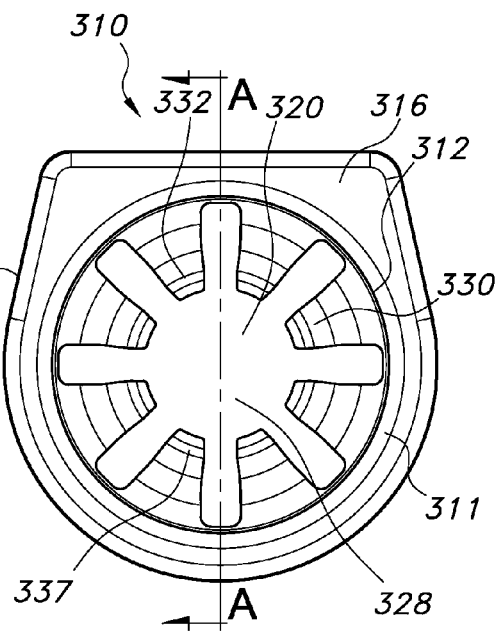
FIGS. 22 and 23 show, respectively, top and bottom plan views of the tag housing assembly shown in FIG. 21.

As shown in FIG. 20, the distal ends of the arms 250 are received in the passages 270 and 272 in the second housing 214 and secured in the clamping position by the spring latches 260, 262. The passages 270, 272 are covered by a thin extent of material 270a, 272a that can be ruptured using a removal tool 280 (as described hereinbelow) to remove the tag housing assembly 210 from the bottle 292.

Figure 19:
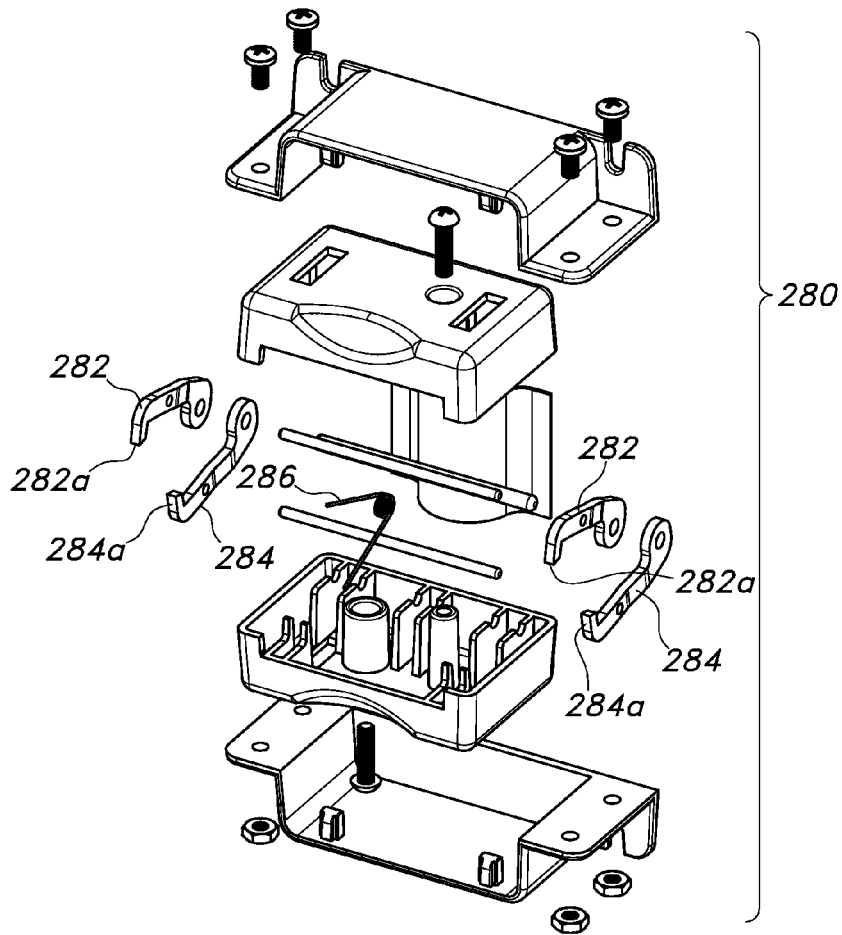
FIG. 19 is an exploded, perspective view of the removal tool used in combination with the tag housing assembly shown in FIG. 13.

The removal tool 280 is shown in FIGS. 19 and 20. The removal tool 280 includes a housing body 281 which supports therein a pair of jaw-like upper and lower finger elements 282 and 284. The jaw-like finger elements 282, 284 are opposed by a spring 286 that provides spring-opposed actuation. When in a closed position, the distal tips 282a, 284a puncture the thin material 270a and 272a over the passages 270, 272 of the housing and contact the distal ends of the spring latches 260, 262 on the arms 250 (FIG. 13). This deflects the spring latches 260, 262 inwardly towards one another releasing them from their latched position and thereby allowing the arms 250 to be withdrawn from the passages 254, 256 so that the first housing 212 is separated from the second housing 214. As the removal tool is pulled back (in the direction of arrow A), the second housing 214 is pulled away from the first housing 212 to expand aperture 228 and permit removal of the housing assembly 210 from the bottle neck 290.

Figure 23:
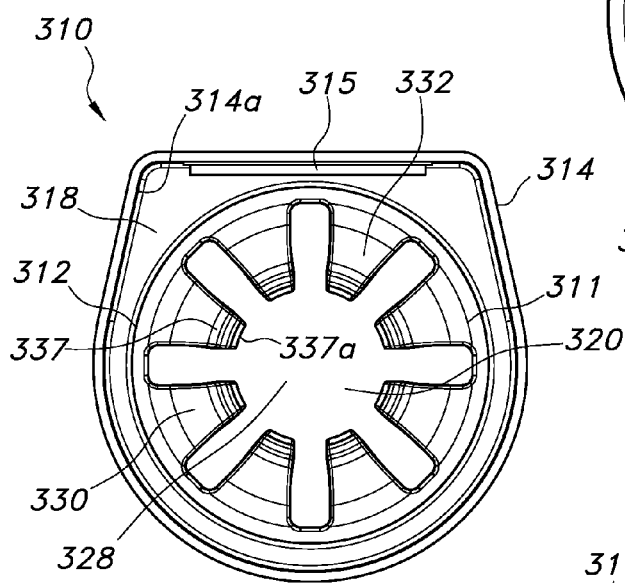
Figure 24:
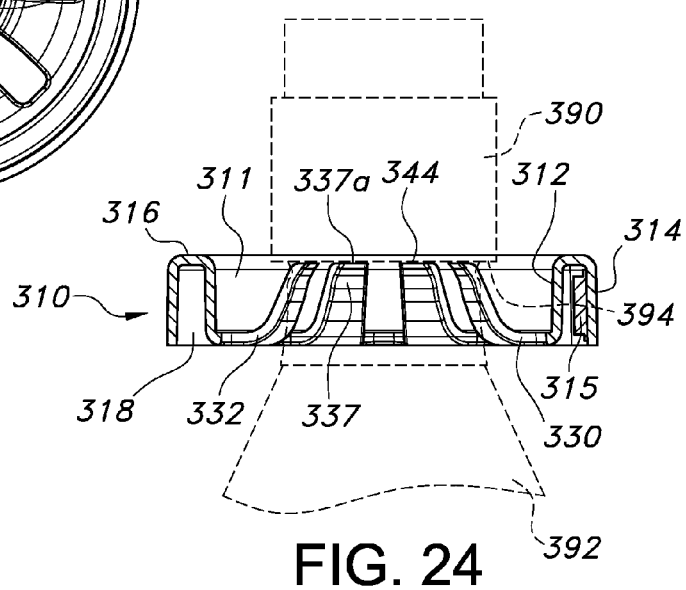
FIG. 24 is a sectional view of the tag housing assembly taken at line A-A shown in FIG. 22 attached to a bottle.
Figure 25:
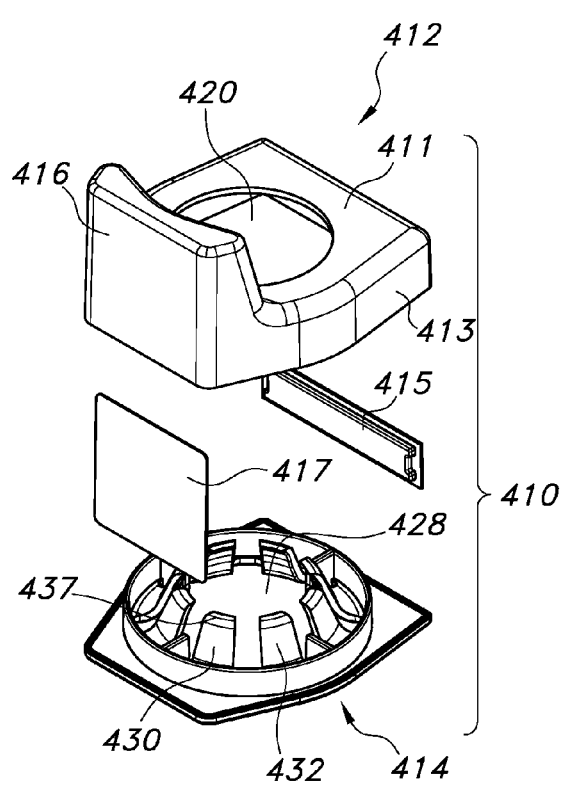
FIG. 25 is an exploded, perspective view of the tag housing assembly of the fourth embodiment of the present invention.
Figure 26:
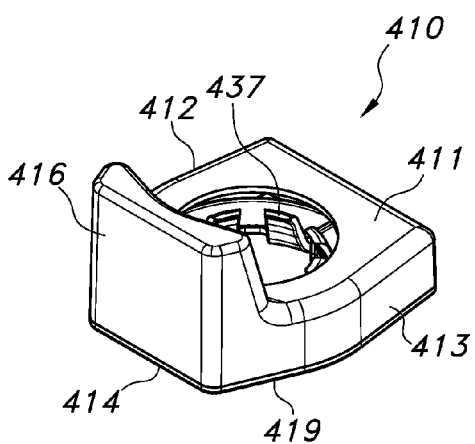
FIG. 26 is a top, perspective view of the tag housing assembly shown in FIG. 25.
Figure 27:
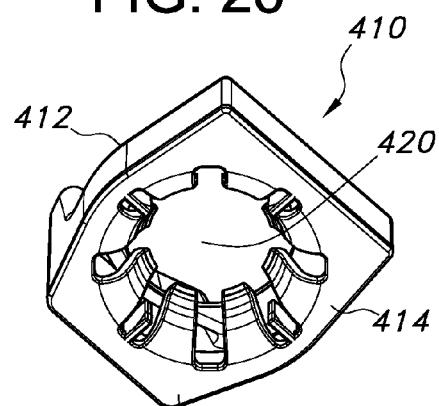
FIG. 27 is a bottom, perspective view of the tag housing assembly shown in FIG. 25.
Figure 28:
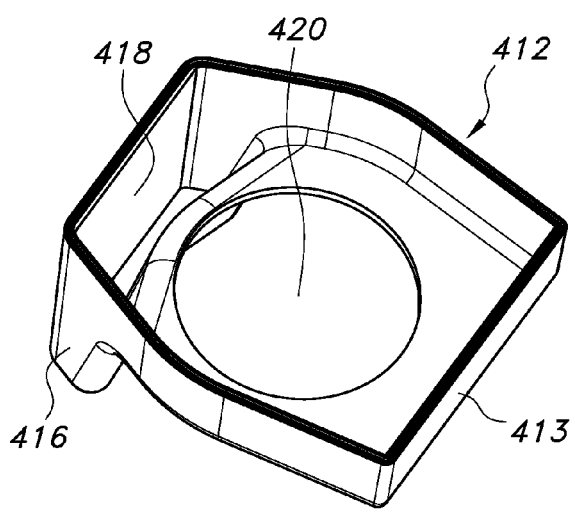
FIG. 28 is a bottom, perspective view of the top housing portion of the tag housing assembly shown in FIG. 25.
Figure 29:
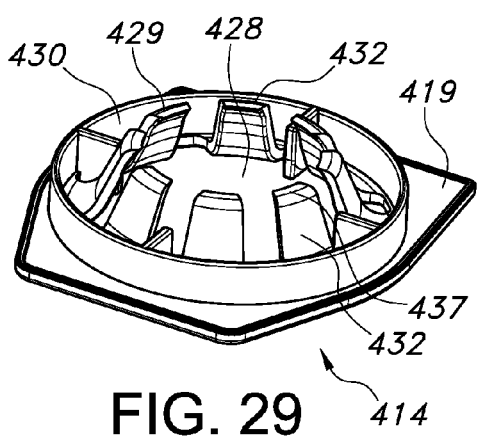
FIG. 29 is a top, perspective view of the bottom housing portion of the tag housing assembly shown in FIG. 25.

In the third embodiment, the tag housing assembly 310 of the present invention is shown in FIGS. 21-24. Tag housing assembly 310 includes a one-piece integrally formed housing 311, which as particularly shown in FIG. 23 includes a perimetrical inner housing wall 312 and a perimetrical outer housing wall 314. A planar surface 316 extends between the inner and outer perimetrical walls 312 and 314. The planar surface 316, the inner perimetrical wall 312 and outer perimetrical wall 314 define an open ended cavity 318, which accommodates an electronic tag 315. The tag 315 may include an EAS or RFID tag, or any similar electronic tag commonly used for such purpose. The inner perimetrical wall 312 defines an opening 320 for insertable accommodation of the neck 390 of a bottle 392 (FIG. 24).

FIG. 23 shows the tag 315 adhesively secured to an inside surface 314a of the outer perimetrical wall 314. Other securement techniques may also be employed. As shown in the FIGS. 22 and 23, one side of outer perimetrical wall 314 may be planar to accommodate securement of the tag 315.

The retaining device 330 is integrally formed with and extend inwardly from the inner perimetrical wall 312. The retaining device 330 has a plurality of inwardly directed, resiliently deflectable fingers 332, which are circumferentially spaced apart. The fingers 332 of the retaining device 330 extend into the opening 320 defined by inner perimetrical wall 312 and define an adjustable aperture 328 for receipt of the neck 390 of bottle 392. The aperture 328 defined by fingers 332 is smaller than the neck 390 of the bottle 392 so that upon insertion of the neck 390 of the bottle 392 into the opening 320 in the tag housing assembly 310, the fingers 332 deflect outwardly to permit passage of the bottle neck 390. The fingers 332 are cantilevered from the base of the inner wall 312 ad extend upwardly therefrom. The fingers 332 are deflectable outwardly to allow the insertion of the bottle neck 390. The deflected fingers 332 tightly grip the bottle neck 390.

Each of the fingers has a distal extent 337 defining an inwardly directed lip 337a, which is seatable against the undercut 394 of the neck 390 of the bottle 392. The construction and arrangement of the fingers 332 permit the fingers to resiliently engage the neck 390 of the bottle 392 and such that the lip 337a non-releasably seats within the undercut 394 of the bottle 392. Once seated in the undercut 394, the tag housing assembly 310 cannot be removed from the bottle neck 390 by sliding it therealong. Such arrangement non-releasably attaches the tag housing assembly 310 to the neck 390 of the bottle 392, preventing non-destructible removal therefrom.

The fourth embodiment is shown in FIGS. 25-37. The tag housing assembly 410 includes an upper housing portion 412 and a lower housing portion 414 that are joined together to define an interior therebetween. The upper housing portion 412 has a top surface 411 with a perimetrical side wall 413 extending downwardly from the top surface 411. The lower housing portion 414 has a base 419. A substantially round or oval opening 420 extends from the top surface 411 of the upper housing portion 412 through the base 419 of the lower housing portion 414 for receiving the neck 490 of a bottle 492 (see FIG. 32). The housing interior can accommodate an EAS tag 415 and/or a RFID tag 417. The lower housing portion 414 has a flexible retaining device 430 extending around the opening 420, which defines an adjustable aperture 428 for accommodation around the neck 490 of a bottle 492. The flexible retaining device 430 is formed by a plurality of flexible fingers 432. The neck 490 of the bottle 492 is inserted into the opening 420 and the flexible fingers 432 engage the perimetrical undercut 494 of the bottle neck 490 with their distal ends 437.

One end of the upper housing portion 412 can extend upwardly from the top surface 411 to form an elongated housing portion 416 with a cavity 418 sized for receiving the EAS tag 415 or a RFID tag 417. The tag 415, 417 is inserted in to the cavity 418 and then the lower housing portion 414 is attached to the upper housing portion 412 using an adhesive or ultrasonic welding. Once the tags are secured inside the tag housing assembly 410, the housing has to be fractured in order to remove the tag(s). FIGS. 30, 31, 33 and 34, 35, 37 show embodiments wherein the elongated housing portion 416 extends upwardly from the end of the upper housing portion 412. After the EAS tag 415 or a RFID tag 417 is inserted in the elongated housing portion 416, a cover is placed over the elongated housing portion 416 and secured in place using an adhesive or ultrasonic welding.

Figure 40:
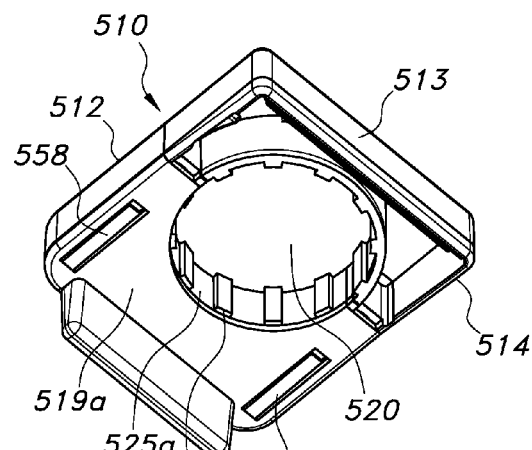
FIG. 40 is a bottom, perspective view of the tag housing assembly shown in FIG. 38 in the closed position.
Figure 41:
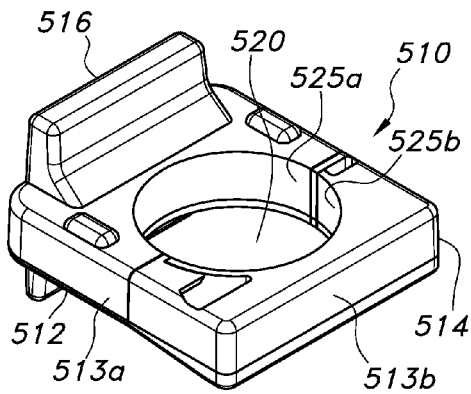
FIG. 41 is a top, perspective view of the tag housing assembly shown in FIG. 38 in the closed position and with a flat, interior wall.
Figure 42:
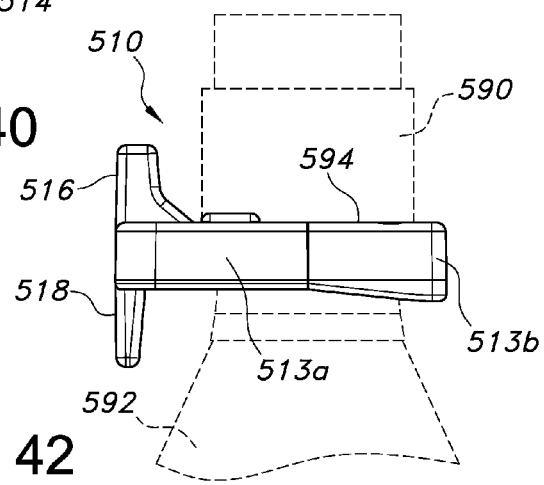
FIG. 42 is a side view of the tag housing assembly shown in FIG. 38 in the closed position attached to a bottle.

The fifth embodiment is shown in FIGS. 38-46. The housing assembly 510 includes a first housing 512 and a second housing 514 capable of supporting an EAS tag 515 and/or a RFID tag 517. The first and second housings 512, 514 each have a top surface 511a, 511b and bottom surface 519a, 519b connected by an interior side wall 525a, 525b and an exterior side wall 513a, 513b. The first and second housings 512, 514 are adjustably and detachably coupled to define a substantially round or oval adjustable opening 520 therebetween for receiving the extending neck of the bottle (FIG. 42). The first and second housings 512, 514 can include one or more ribs 527a, 527b disposed on the interior side walls 525a, 525b, respectively, and extending between the top surfaces 511a, 511b and base plates 519a, 519b, which engagingly secure the neck 590 of the bottle 592 therebetween. As shown in FIG. 41, the interior side walls 525a, 525b can also be substantially flat. The first and second housings 512, 514 are movable to an attached, clamped position about the bottle neck 590 and subsequently movable to a detached, unclamped position to permit removal of the bottle 592 from the opening 520.

Figure 38:
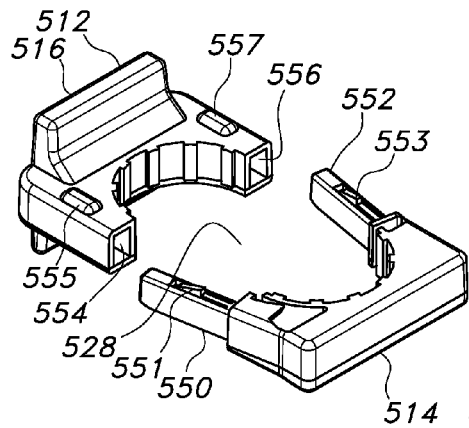
FIG. 38 is a top, perspective view of the two-piece detachable tag housing assembly of the fifth embodiment of the present invention in the open position.
Figure 39:
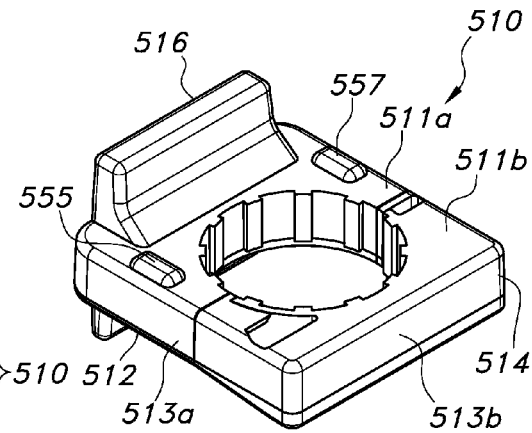
FIG. 39 is a top, perspective view of the tag housing assembly shown in FIG. 38 in the closed position.
Figure 43:
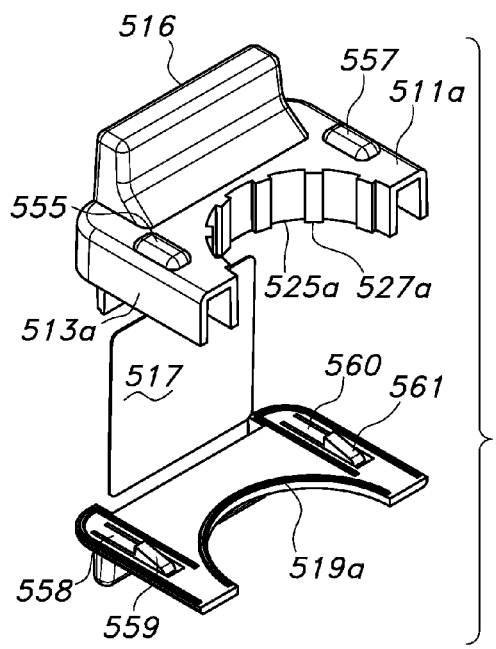
FIG. 43 is an exploded, perspective view of the first housing of the tag housing assembly shown in FIG. 38.
Figure 44:
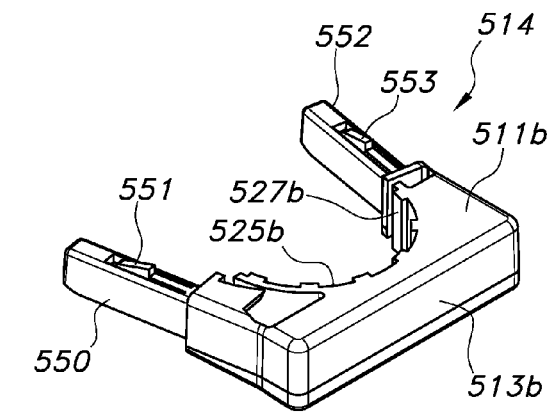
FIG. 44 is a perspective view of the second housing of the tag housing assembly shown in FIG. 38.
Figure 45:
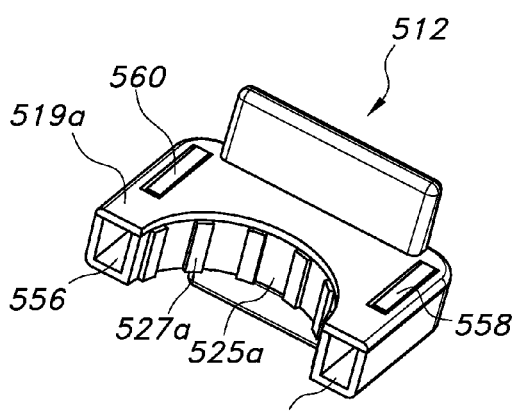
FIG. 45 is a bottom, perspective view of the first housing of the tag housing assembly shown in FIG. 38.
Figure 46:
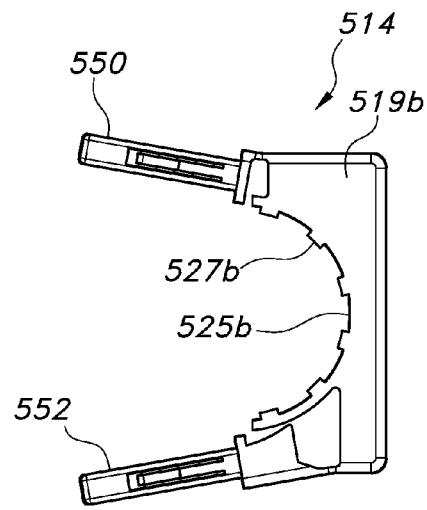
FIG. 46 is a bottom view of the second housing of the tag housing assembly shown in FIG. 38.
Figures 52, 53:
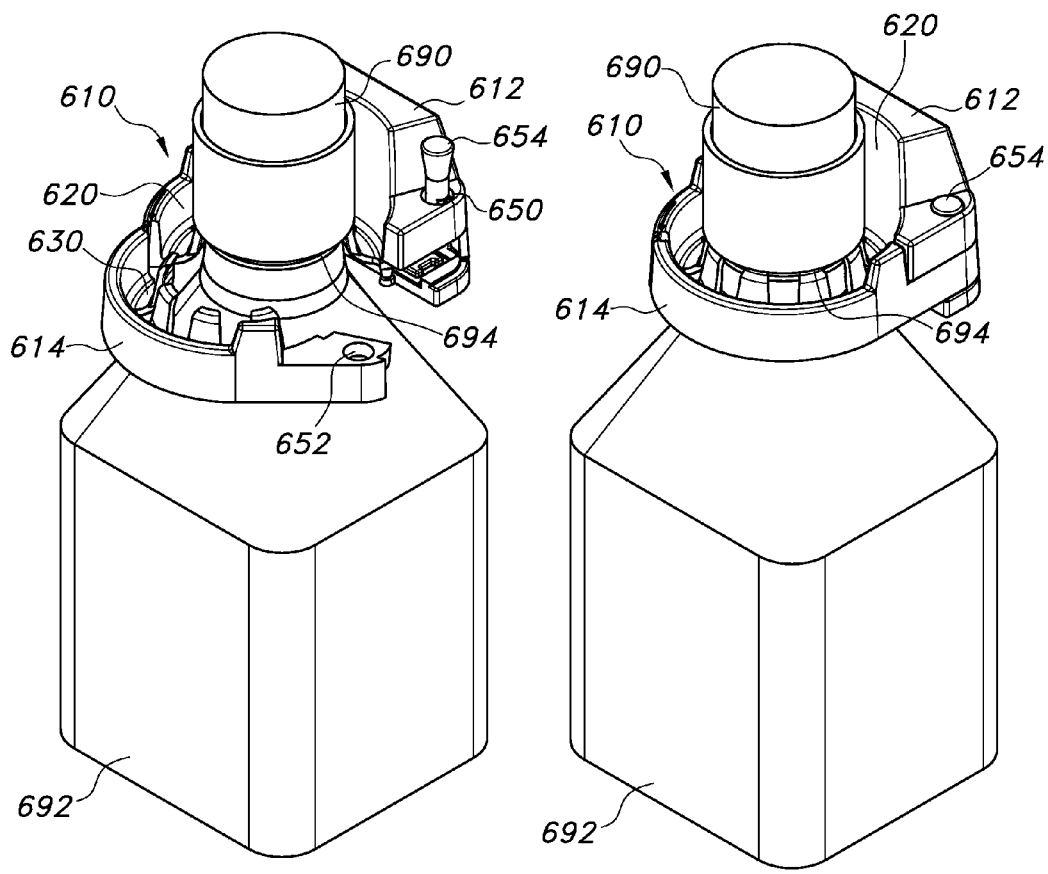
FIG. 52 is a perspective view of a pivotal tag housing assembly positioned around the neck of a bottle in the open position.
FIG. 53 is a perspective view of a pivotal tag housing assembly positioned around the neck of a bottle in the closed position.
Figure 54:
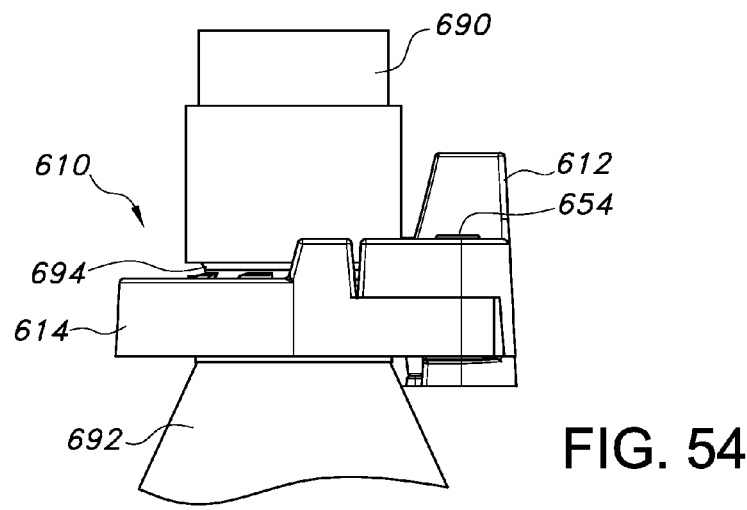
FIG. 54 is a detail, side view of the pivotal tag housing assembly shown in FIG. 53.
Figure 55:
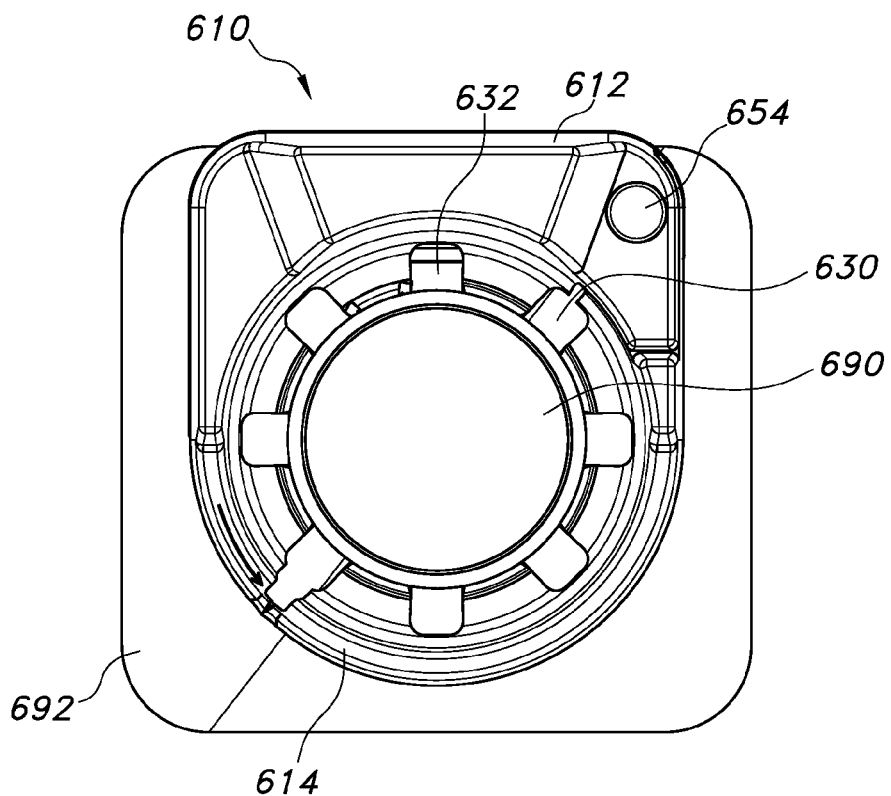
FIG. 55 is a top view of the pivotal tag housing assembly shown in FIG. 53.
Figure 56:
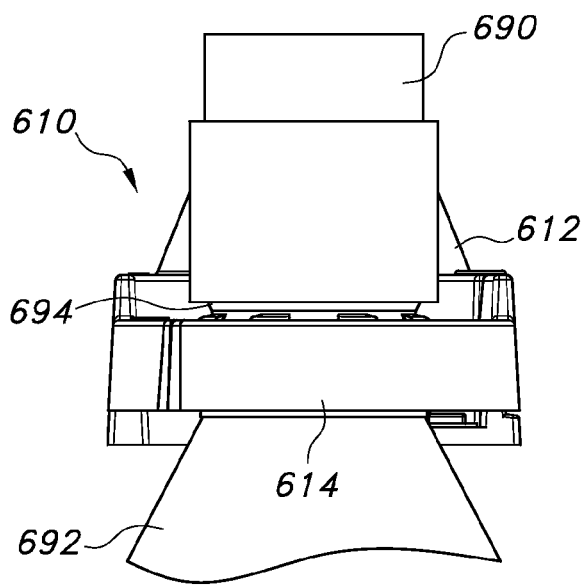
FIG. 56 is side view of the pivotal tag housing assembly shown in FIG. 53.

As shown in FIGS. 38, 43 and 44, a pair of arms 550, 552 extend from the side of the second housing 514 and are adjustably inserted in a pair of passages 554, 556 in the first housing 512. Each arm 550, 552 has a spring loaded latch 551, 553 on the top surface that engages a recess 555, 557 that extends into the top surface 511a of the first housing 512. When the tag housing assembly 510 is attached to a bottle 592 (FIG. 42), the arms 550, 552 are inserted into the passages 554, 556 and the latches 551, 553 engage the recesses 555, 557 to secure the first and second housings 512, 514 in a clamped or closed position. The tag housing assembly 510 can be removed using a tool similar to the one shown in FIGS. 19 and 20. FIGS. 40 and 43 show a pair of flexible members 558, 560 in the base plate 519a of the first housing 512. As shown in FIG. 43, these members 558, 560 are aligned with the passages 554, 556 in the first housing 512 and have tapered distal ends 559, 561. To remove the tag housing assembly 510 from the neck 590 of a bottle 592, the tool presses inwardly on the two recesses 555, 557 on one side of the first housing 512 and on the flexible members 558, 560 on the other side to disengage the arms 550, 552 so that they can be withdrawn from the passages 554, 556 and the two housings 512, 514 separated.

As shown in FIG. 43, one end of the upper housing portion 512 can extend upwardly from the top surface 511*a* to form an elongated housing portion 516 with a cavity 518 sized for receiving a RFID tag 517. The tag 517 is inserted in to the cavity 518 and then the base plate 519*a* is attached to the upper housing portion 512 using an adhesive or ultrasonic welding.

In the sixth embodiment shown in FIGS. 47-56, the tag housing assembly 610 includes a first housing 612 and a second housing 614 capable of supporting at least one electronic tag, preferably an EAS tag 615 and/or a RFID tag 617. FIGS. 47, 48, 50 and 51 show the tag housing 610 and FIGS. 49 and 52-56 show the tag housing 610 attached to a bottle 692. The first and second housings 612, 614 each have a top surface 611*a*, 611*b*, an exterior side wall 613*a*, 613*b* and an interior side wall 625*a*, 625*b*. The first and second housings 612, 614 are pivotally connected on one side, preferably by a hinge 616, and attachably coupled on the opposing side so that the two housings 612, 614 pivot in a plane that is parallel to the top surfaces 611*a*, 611*b*. When the first and second housings 612, 614 are coupled, the interior side walls 625*a*, 625*b* define a substantially round or oval opening 620 therebetween for receiving the extending neck 690 of the bottle 692. A flexible retaining device 630 extends around the opening 620 and defines an adjustable aperture 628 for accommodation around the bottle neck 690. Preferably, the flexible retaining device 630 is formed by a plurality of flexible fingers 632, which engage the perimetrical undercut 694 of the bottle neck 690 with their distal ends 637. The first and second housings 612, 614 are movable to an attached, coupled or clamped position about the bottle neck 690 and subsequently movable to a detached, unclamped position to permit removal of the bottle 690 from the tag housing assembly 610.

The exterior walls 613*a*, 613*b* of the tag housing assembly 610 are substantially rectangular in shape and the first and second housings 612, 614 are pivotally connected by a hinge 626 located at one corner and releasably connected by a locking mechanism located at the opposing corner. Preferably, the locking mechanism includes a first locking aperture 650 in the first housing 612 and a second locking aperture 652 in the second housing 614. After the tag housing assembly 610 is attached to the neck 690 of a bottle 692, the first and second locking apertures 650, 652 are aligned and a locking pin 654 is inserted therethrough to secure the two housings 612, 614 together. The locking pin 654 can be permanently secured in the locking apertures 650, 652 by various methods well known to those skilled in the art, such as a latching device at the distal end of the locking pin 654.

One end of the upper housing portion 612 can extend upwardly from the top surface 611*a* to form an elongated housing portion 616 with a cavity 618 sized for receiving the EAS tag 615 or a RFID tag 617. The tag 615, 617 is inserted in to the cavity 618 and then the base 619 of the first housing 612 is attached using an adhesive or ultrasonic welding. Once the tags are secured inside the tag housing assembly 610, the housing has to be fractured in order to remove the tag(s).

What is claimed is:

1. A tag housing assembly for attaching an electronic tag to an extending neck of a bottle, wherein the neck has a perimetrical undercut thereabout, the tag housing assembly comprising:
    a tag housing comprising a perimetrical exterior side wall extending between a top surface and a base plate to define an interior and an opening extending through the top surface and the base plate for receiving the extending neck of the bottle;
    at least one electronic tag located in the interior; and
    a retaining device extending into the opening and defining an adjustable aperture for engaging the extending neck of the bottle;
    wherein, when the tag housing is in a closed position, the retaining device is secured to the neck of the bottle.

2. The tag housing assembly according to claim 1, wherein the retaining device comprises a plurality of flexible fingers, wherein each flexible finger extends from the base plate to a distal end for surrounding engagement with the neck of the bottle.

3. The tag housing assembly according to claim 2, wherein the flexible fingers extend upwardly from the base plate.

4. The tag housing assembly according to claim 3, wherein the retaining device is fixedly attached to the base plate and the size of the adjustable aperture increases to receive a bottle neck, and wherein, after the perimetrical undercut passes through the adjustable aperture, the distal ends of the fingers engage the bottle neck and prevent the tag housing assembly from being removed from the bottle.

5. The tag housing assembly according to claim 1, wherein the tag housing comprises a first housing and a second housing, wherein the first and second housings are detachably connected or fixedly attached.

6. The tag housing assembly according to claim 5, wherein the first and second housings are pivotably connected by a hinge.

7. The tag housing assembly according to claim 6, wherein the first housing comprises a first latching element and the second housing comprises a second latching element opposite the hinge.

8. The tag housing assembly according to claim 7, wherein the first and second latching elements are first and second latching apertures, respectively, and wherein, when the tag housing is in the closed position, the first and second latching apertures are aligned.

9. The tag housing assembly according to claim 8, wherein the tag housing further comprises a latching pin, wherein the latching pin is inserted in the first and second latching apertures to lock the tag housing.

10. The tag housing assembly according to claim 5, wherein the first housing comprises the top surface and the second housing comprises the base plate.

11. The tag housing assembly according to claim 5, wherein the exterior side wall has a first end and a second end and first and second substantially parallel sides extending therebetween, and wherein the first housing comprises the first end and the first side and the second housing comprises the second end and the second side.

12. The tag housing assembly according to claim 11, wherein the first housing comprises a pair of arms and the second housing comprises a pair of passages for receiving the arms, and wherein each of the pair of the arms has a latch for securing the arms in the passages.

13. The tag housing assembly according to claim 12, wherein the retaining device is an interior wall extending between the top surface and the base plate that defines the opening in the tag housing.

14. The tag housing assembly according to claim 13, wherein the interior wall has a plurality of substantially parallel ribs extending into the opening and perpendicular to the top surface.

15. The tag housing assembly according to claim 5, wherein the retaining device comprises a first section fixedly attached to the base plate and a second section that is movably attached to the base plate, and wherein the movement of the second section changes the size of the adjustable aperture.

16. The tag housing of claim 15, wherein the first and second sections of the retaining device comprise a plurality of flexible fingers, wherein each flexible finger extends from the base plate to a distal end for surrounding engagement with the perimetrical undercut of the neck of the bottle.

17. The tag housing of claim 16, wherein the tag housing further comprises a locking mechanism for locking the movable second section of the retaining device in a fixed position.

18. The tag housing of claim 15, wherein the second section of the retaining device is movable within the housing interior upon application of a removal tool.

19. A tag housing assembly for attaching an electronic tag to an extending neck of a bottle, wherein the neck has a perimetrical undercut thereabout, the tag housing assembly comprising:
  a tag housing comprising a perimetrical exterior side wall extending between a top surface and a base plate to define an interior and an opening extending through the top surface and the base plate for receiving the extending neck of the bottle, wherein the tag housing comprises a first housing and a second housing, wherein the first and second housings are detachably connected or fixedly attached, wherein the perimetrical exterior side wall has a first end and a second end and first and second substantially parallel sides extending therebetween, and wherein the first housing comprises the first end and the first side and the second housing comprises the second end and the second side;
  at least one electronic tag located in the interior; and
  a retaining device extending into the opening and defining an adjustable aperture for engaging the extending neck of the bottle;
  wherein, when the tag housing is in a closed position, the retaining device is secured to the neck of the bottle.

20. The tag housing assembly according to claim 19, wherein the retaining device comprises a plurality of flexible fingers, wherein each flexible finger extends from the base plate to a distal end for surrounding engagement with the neck of the bottle.

* * * * *

UNITED STATES PATENT AND TRADEMARK OFFICE
CERTIFICATE OF CORRECTION

| | | |
|---|---|---|
| PATENT NO. | : 9,607,259 B2 | Page 1 of 1 |
| APPLICATION NO. | : 14/768957 | |
| DATED | : March 28, 2017 | |
| INVENTOR(S) | : Norman et al. | |

It is certified that error appears in the above-identified patent and that said Letters Patent is hereby corrected as shown below:

In the Specification

Column 2, Line 4:
Now reads: "tag housing and";
Should read: -- tag housing and locked together by a latching mechanism on the opposite side. --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*